US010215111B2

(12) United States Patent
Hagari et al.

(10) Patent No.: US 10,215,111 B2
(45) Date of Patent: Feb. 26, 2019

(54) CONTROLLER AND CONTROL METHOD FOR INTERNAL COMBUSTION ENGINE

(71) Applicant: Mitsubishi Electric Corporation, Tokyo (JP)

(72) Inventors: Hideki Hagari, Tokyo (JP); Kazuhiro Tokuyama, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 48 days.

(21) Appl. No.: 15/431,852

(22) Filed: Feb. 14, 2017

(65) Prior Publication Data
US 2018/0087459 A1 Mar. 29, 2018

(30) Foreign Application Priority Data

Sep. 27, 2016 (JP) .................................. 2016-187791

(51) Int. Cl.
*F02D 35/02* (2006.01)
*F02D 37/02* (2006.01)
(Continued)

(52) U.S. Cl.
CPC ......... *F02D 35/023* (2013.01); *F02D 35/024* (2013.01); *F02D 35/028* (2013.01);
(Continued)

(58) Field of Classification Search
CPC .. F02D 35/023; F02D 35/024; F02D 2250/28; F02D 2200/10; F02D 2200/1002;
(Continued)

(56) References Cited

U.S. PATENT DOCUMENTS

| 4,843,870 | A | * | 7/1989 | Citron | ................. | F02D 41/1498 |
| | | | | | | 73/114.15 |
| 5,501,109 | A | * | 3/1996 | Naito | ...................... | B60L 3/102 |
| | | | | | | 73/114.15 |
| 5,546,793 | A | * | 8/1996 | Gimmler | ................... | G01L 3/00 |
| | | | | | | 701/110 |
| 5,715,794 | A | * | 2/1998 | Nakamura | .............. | F02D 21/08 |
| | | | | | | 123/305 |
| 5,771,482 | A | * | 6/1998 | Rizzoni | .............. | F02D 41/1401 |
| | | | | | | 123/406.23 |
| 6,223,120 | B1 | * | 4/2001 | Williams | ............... | G01M 15/11 |
| | | | | | | 701/102 |
| 7,121,975 | B2 | * | 10/2006 | Tomura | ................. | B60K 6/445 |
| | | | | | | 477/2 |

(Continued)

FOREIGN PATENT DOCUMENTS

| JP | 08-165950 A | 6/1996 |
| JP | 2004-340878 A | 12/2004 |
| JP | 2009-275618 A | 11/2009 |

*Primary Examiner* — Sizo Vilakazi
*Assistant Examiner* — Kevin R Steckbauer
(74) *Attorney, Agent, or Firm* — Sughrue Mion, PLLC; Richard Turner

(57) ABSTRACT

To provide a controller and a control method for an internal combustion engine capable of estimating the cylinder internal pressure of the combustion cylinder accurately in consideration of the torsional vibration of the crankshaft. A controller for an internal combustion engine includes a torsional torque calculator that calculates a value which has an amplitude of the maximum value of torsional vibration torque calculated based on a crank angle acceleration in the combustion period, and vibrates with a preliminarily set natural angular frequency, as a torsional vibration torque in the combustion period; and a cylinder internal pressure estimator that calculates a combustion gas pressure torque, by use of the equation of motion of the rotation system of the crankshaft, based on the crank angle, the crank angle acceleration, and the torsional vibration torque, and estimates the (Continued)

cylinder internal pressure of the combustion cylinder based on the combustion gas pressure torque.

7 Claims, 9 Drawing Sheets

(51) Int. Cl.
<table>
<tr><td>F02D 41/00</td><td>(2006.01)</td></tr>
<tr><td>F02D 41/26</td><td>(2006.01)</td></tr>
<tr><td>G01D 5/12</td><td>(2006.01)</td></tr>
<tr><td>G01L 3/04</td><td>(2006.01)</td></tr>
<tr><td>G01L 23/24</td><td>(2006.01)</td></tr>
<tr><td>F02D 41/14</td><td>(2006.01)</td></tr>
</table>

(52) U.S. Cl.
CPC ......... *F02D 37/02* (2013.01); *F02D 41/0047* (2013.01); *F02D 41/1498* (2013.01); *F02D 41/26* (2013.01); *G01D 5/12* (2013.01); *G01L 3/04* (2013.01); *G01L 23/24* (2013.01); *F02D 41/005* (2013.01); *F02D 2200/101* (2013.01); *F02D 2200/1012* (2013.01); *F02D 2250/28* (2013.01)

(58) Field of Classification Search
CPC ..... F02D 2200/1004; F02D 2200/1006; F02D 2200/101; F02D 2200/1012
USPC ............................. 73/114.15, 114.22, 114.24
See application file for complete search history.

(56) References Cited

U.S. PATENT DOCUMENTS

| | | | |
|---|---|---|---|
| 7,593,796 B2* | 9/2009 | Prokhorov | F02D 41/009 |
| | | | 701/29.1 |
| 7,809,489 B2* | 10/2010 | Koeller | F02D 41/1497 |
| | | | 123/435 |
| 7,958,779 B2* | 6/2011 | Nagano | F02D 41/0097 |
| | | | 73/114.15 |
| 9,903,290 B2* | 2/2018 | Hagari | F02D 37/02 |
| 9,938,921 B2* | 4/2018 | Hagari | F02D 35/024 |
| 2004/0142790 A1* | 7/2004 | Tomura | B60K 6/445 |
| | | | 477/2 |
| 2008/0105233 A1* | 5/2008 | Koeller | F02D 41/1497 |
| | | | 123/435 |
| 2008/0125929 A1* | 5/2008 | Prokhorov | F02D 41/009 |
| | | | 701/31.4 |
| 2009/0282903 A1* | 11/2009 | Nagano | F02D 41/0097 |
| | | | 73/114.15 |
| 2017/0204795 A1* | 7/2017 | Hagari | F02D 37/02 |
| 2017/0292466 A1* | 10/2017 | Hagari | F02D 35/024 |

\* cited by examiner

| ANGLE IDENTIFICATION NUMBER n | 1 | 2 | ... | n−1 | n | n+1 | ... | 90 |
|---|---|---|---|---|---|---|---|---|
| CORRECTION VALUE Kc | Kc(1) | Kc(2) | ... | Kc(n−1) | Kc(n) | Kc(n+1) | ... | Kc(90) |

WITHOUT CONSIDERATION OF TORSIONAL TORQUE
(COMPARATIVE EXAMPLE)

WITH CONSIDERATION OF TORSIONAL TORQUE

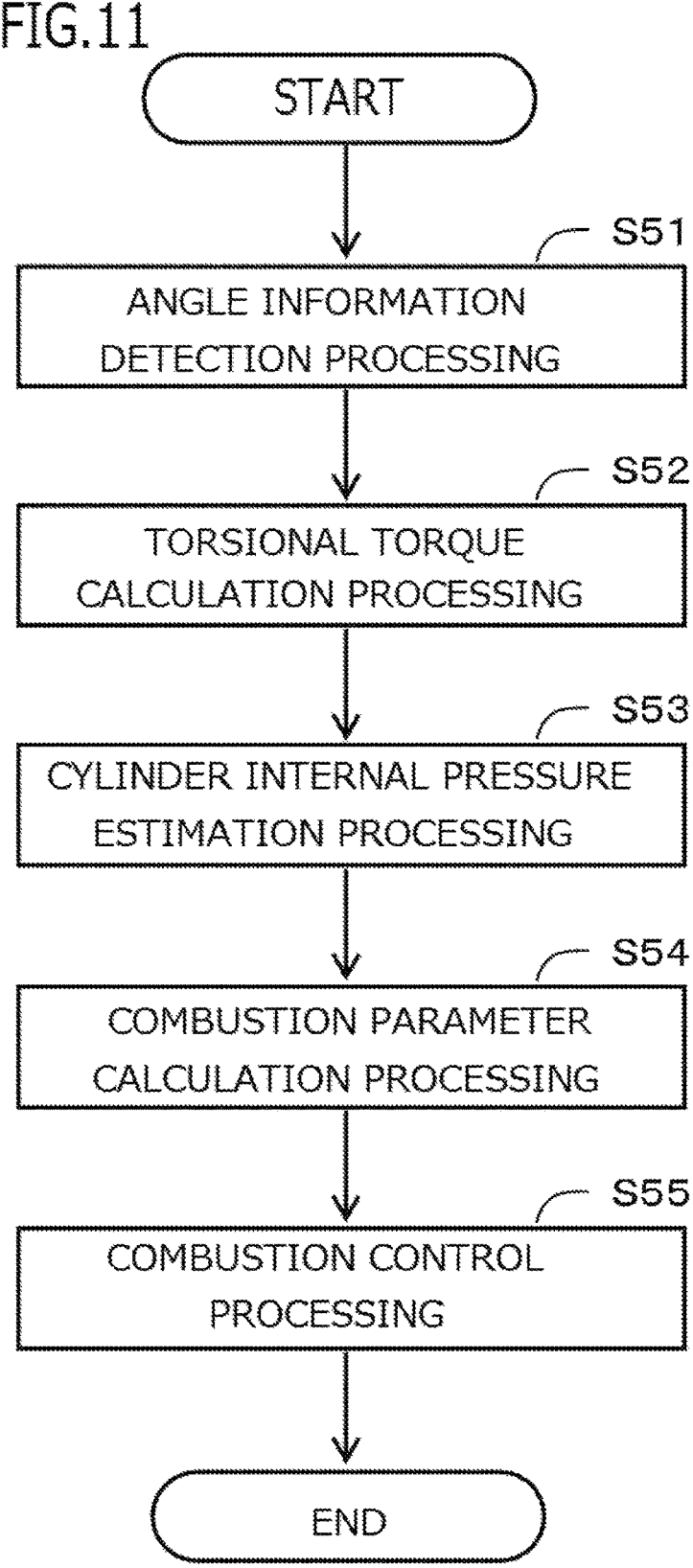

CONTROLLER AND CONTROL METHOD FOR INTERNAL COMBUSTION ENGINE

INCORPORATION BY REFERENCE

The disclosure of Japanese Patent Application No. 2016-187791 filed on Sep. 27, 2016 including its specification, claims and drawings, is incorporated herein by reference in its entirety.

BACKGROUND

The present invention relates to a controller and a control method for an internal combustion engine, provided with a plurality of detected units provided in a rotation member, which rotates integrally with a crankshaft, at a plurality of preliminarily set crank angles, and a specific crank angle sensor which is fixed to a nonrotation member and detects the detected unit.

In order to improve the fuel consumption performance and the emission performance of the internal combustion engine, the method of measuring the combustion condition of the internal combustion engine and carrying out feedback control of the measuring result is effective. For that purpose, it is important to measure the combustion condition of the internal combustion engine accurately. It is known widely that the combustion condition of the internal combustion engine can be measured accurately by measuring the cylinder internal pressure. However, since the sensor (hereinafter, the cylinder internal pressure sensor) which measures the cylinder internal pressure directly is very expensive, it is considered that it is difficult to use the cylinder internal pressure sensor for the commercial automobile internal combustion engine. As a technology of estimating the combustion condition of the internal combustion engine instead of the cylinder internal pressure sensor, Japanese Patent Application Publication No. 2009-275618 (JP-A-2009-275618) discloses a technology in which calculates a crank angle speed and a crank angle acceleration based on the output signal of the crank angle sensor, calculates a combustion gas pressure torque which was produced by combustion based on the crank angle speed and the crank angle acceleration, and estimates the combustion condition by the combustion gas pressure torque.

SUMMARY

However, in the internal combustion engine which has a plurality of cylinders, combustion gas pressure torque of a plurality of cylinders is intermittently transmitted to the crankshaft. On the other hand, since the crankshaft is not a rigid body but an elastic body, torsional vibration is generated in the crankshaft. Accordingly, the crank angle speed and the crank angle acceleration which were calculated based on the crank angle sensor are influenced by torsional vibration. In JP-A-2009-275618, since the crankshaft is treated as a rigid body, there has been a problem that the combustion condition measured under the condition which torsional vibration is generated in the crankshaft is not necessarily accurate.

For the above problem, for example, the technology described in Japanese Patent Application Publication No. 2004-340878 (JP-A-2004-340878) is already known. In the technology of JP-A-2004-340878, it is described that the torsional vibration angular displacement of the crankshaft and the internal cylinder pressure are measured, and engine effective power can be identified based on the equation of motion of the torsional vibration computation model shown in the paragraph 0026 and FIG. 7 of JP-A-2004-340878. However, in the technology of JP-A-2004-340878, the cylinder internal pressure sensor is required, moreover, the above-mentioned equation of motion is a very complicated form, and there are many constants (inertia moment, torsional rigidity, attenuation component, and the like) which require matching, since it is difficult to secure calculation accuracy, it is considered that it is difficult to apply to estimation of the combustion gas pressure torque practically.

As a simpler method, for example, the technology described in Japanese Patent Application Publication No. H08-165950 (JP-A-H08-165950) is already known. In the technology of JP-A-H08-165950, it is described that the torsion amount α of the crankshaft is calculated by detecting the time difference of two crank angle sensors attached to the both ends of the crankshaft. However, as described in the paragraphs 0007 and 0008 of JP-A-H08-165950, since the torsion amount is varied complicatedly and also the average torsion amount is as small as about 0.01 to 0.03 degree, it is considered that it is difficult to calculate the torsion amount of the crankshaft accurately.

Thus, it is desirable to provide a controller and a control method for an internal combustion engine capable of estimating the cylinder internal pressure of the combustion cylinder accurately in consideration of the torsional vibration of the crankshaft.

According to a first aspect of the present invention, a controller for an internal combustion engine that is provided with a plurality of detected units provided in a rotation member, which rotates integrally with a crankshaft, at a plurality of preliminarily set crank angles, and a specific crank angle sensor which is fixed to a nonrotation member and detects the detected unit, the controller for an internal combustion engine includes:

an angle information calculator that detects a crank angle based on an output signal of the specific crank angle sensor, and calculates a crank angle speed which is a time change rate of the crank angle, and a crank angle acceleration which is a time change rate of the crank angle speed;

a torsional torque calculator that calculates a maximum value of a torsional vibration torque which is a vibration component of a torsional torque produced by torsion of the crankshaft, based on the crank angle acceleration in a combustion period, and calculates a value which has an amplitude of the maximum value of the torsional vibration torque and vibrates with a preliminarily set natural angular frequency of the torsional vibration, as the torsional vibration torque in the combustion period; and a cylinder internal pressure estimator that calculates a combustion gas pressure torque produced by combustion, by use of an equation of motion of a rotation system of the crankshaft containing piston, connecting rod, and crank of the internal combustion engine, based on the crank angle, the crank angle acceleration, and the torsional vibration torque, and estimates a cylinder internal pressure of a combustion cylinder, based on the combustion gas pressure torque and the crank angle.

According to a second aspect of the present invention, a control method for an internal combustion engine that is provided with a plurality of detected units provided in a rotation member, which rotates integrally with a crankshaft, at a plurality of preliminarily set crank angles, and a specific crank angle sensor which is fixed to a nonrotation member and detects the detected unit, the control method for an internal combustion engine includes:

an angle information calculating that detects a crank angle based on an output signal of the specific crank angle sensor, and calculates a crank angle speed which is a time change rate of the crank angle, and a crank angle acceleration which is a time change rate of the crank angle speed;

a torsional torque calculating that calculates a maximum value of a torsional vibration torque which is a vibration component of a torsional torque produced by torsion of the crankshaft, based on the crank angle acceleration in a combustion period, and calculates a value which has an amplitude of the maximum value of the torsional vibration torque and vibrates with a preliminarily set natural angular frequency of the torsional vibration, as the torsional vibration torque in the combustion period; and a cylinder internal pressure estimating that calculates a combustion gas pressure torque produced by combustion, by use of an equation of motion of a rotation system of the crankshaft containing piston, connecting rod, and crank of the internal combustion engine, based on the crank angle, the crank angle acceleration, and the torsional vibration torque, and estimates a cylinder internal pressure of a combustion cylinder, based on the combustion gas pressure torque and the crank angle.

According to the controller and the control method for the internal combustion engine concerning the present invention, since the maximum value of torsional vibration torque which becomes the amplitude of torsional vibration torque is varied every combustion, it is calculated based on the crank angle acceleration. On the other hand, since the natural angular frequency of torsional vibration torque becomes a predetermined value, it is preliminarily set. Then, the value which has the amplitude of the maximum value of torsional vibration torque and vibrates with the natural angular frequency is calculated as the torsional vibration torque in the combustion period. Therefore, without solving the equation of motion of a plurality of inertia systems, by simple calculation, the torsional vibration torque can be accurately calculated. Then, by reflecting the torsional vibration torque on calculation of the cylinder internal pressure of the combustion cylinder, the calculation accuracy of the cylinder internal pressure of the combustion cylinder can be improved.

BRIEF DESCRIPTION OF THE DRAWINGS

FIG. 11 is a flowchart showing a procedure of schematic processing according to Embodiment 1 of the present invention.

DETAILED DESCRIPTION OF THE EMBODIMENTS

1. Embodiment 1

Figure 1:
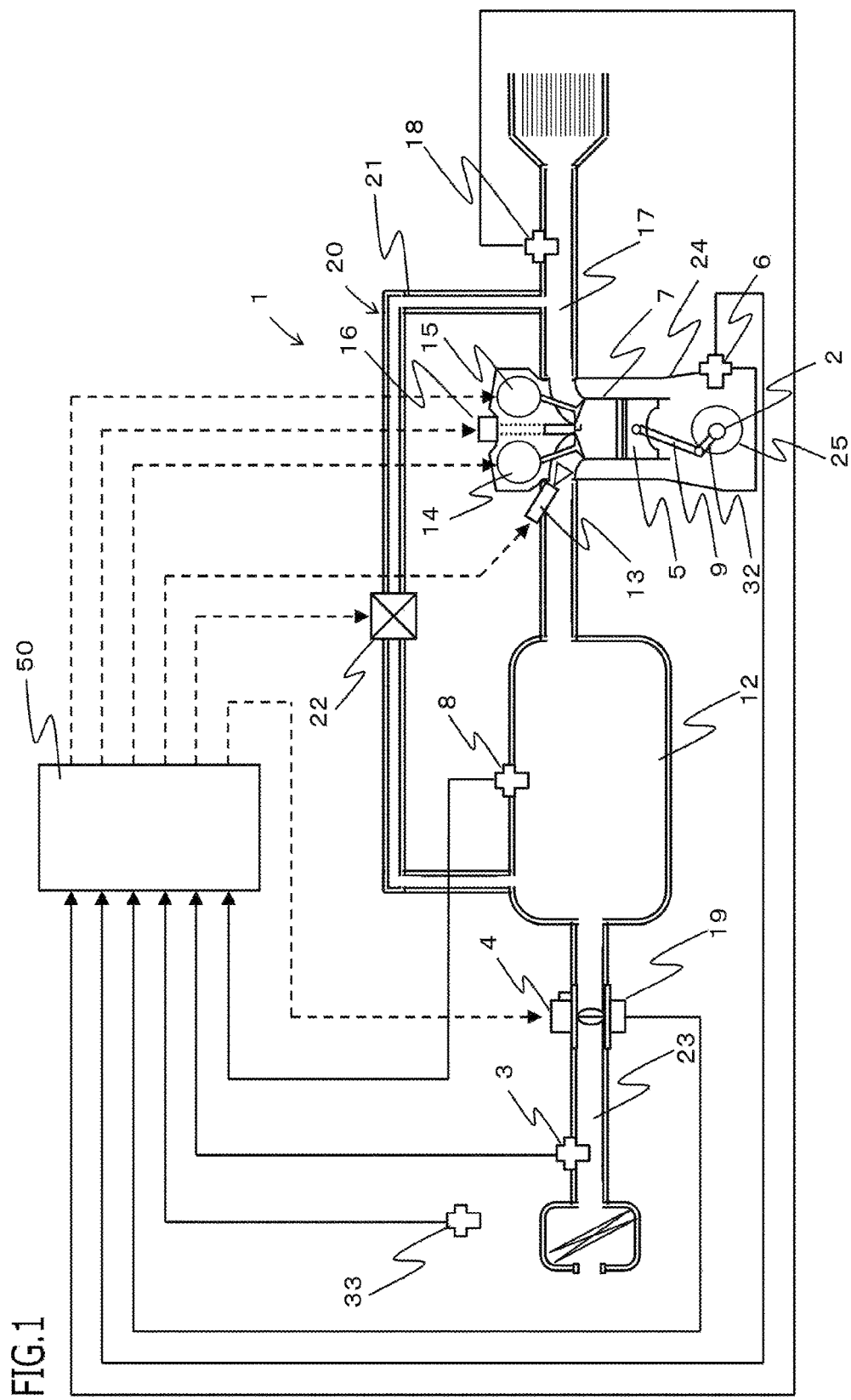
FIG. 1 is a schematic configuration diagram of an internal combustion engine and a controller according to Embodiment 1 of the present invention.
Figure 2:
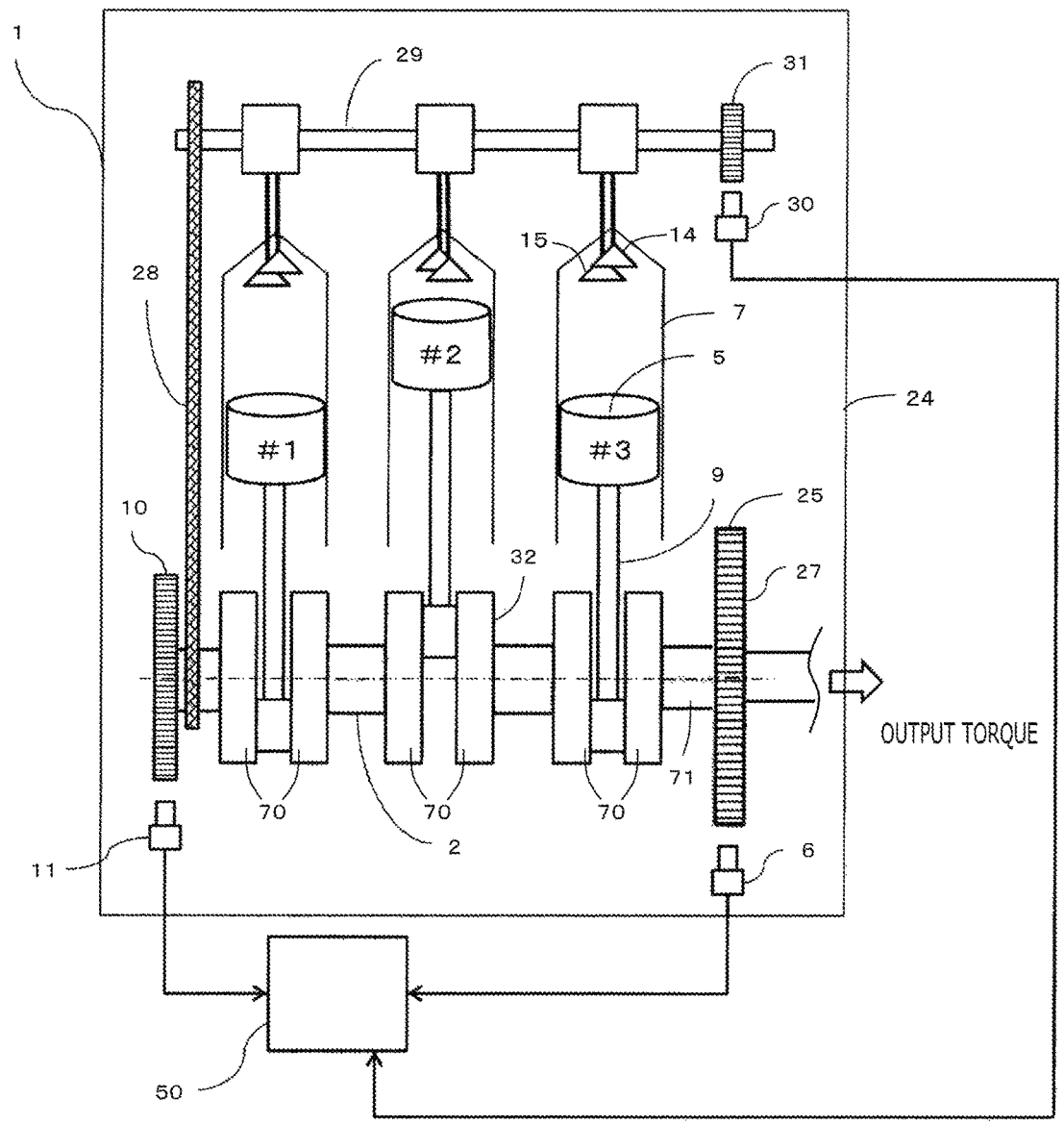
FIG. 2 is a schematic configuration diagram of an internal combustion engine and a controller according to Embodiment 1 of the present invention.
Figure 3:
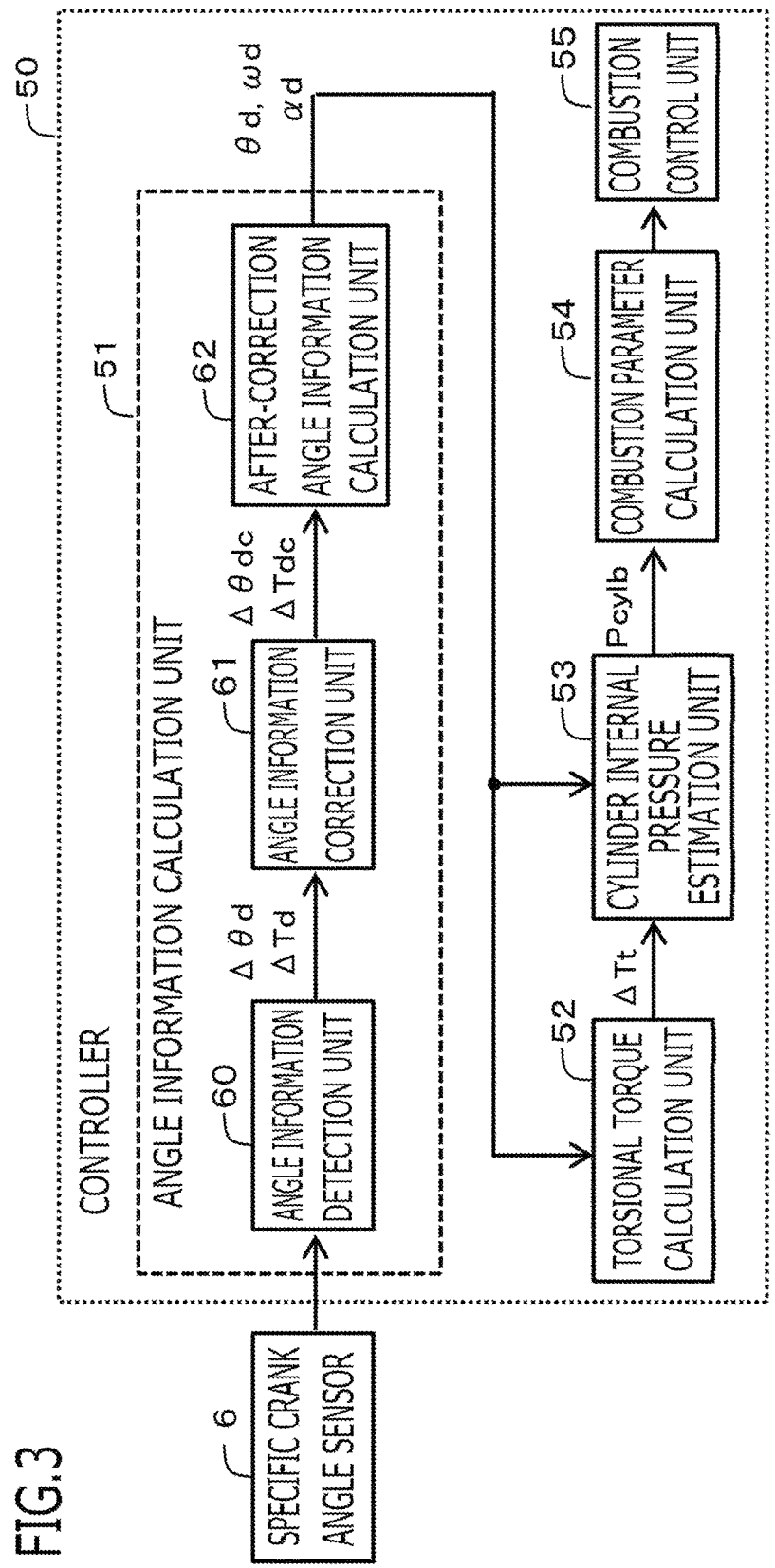
FIG. 3 is a block diagram of a controller according to Embodiment 1 of the present invention.

A controller 50 for an internal combustion engine 1 (hereinafter, referred to simply as the controller 50) according to Embodiment 1 will be explained with reference to the drawings. FIG. 1 and FIG. 2 are a schematic configuration diagram of the internal combustion engine 1 and the controller 50; FIG. 3 is a block diagram of the controller 50 according to Embodiment 1. The internal combustion engine 1 and the controller 50 are mounted in a vehicle; the internal combustion engine 1 functions as a driving-force source for the vehicle (wheels).

1-1. The Configuration of the Internal Combustion Engine 1

The configuration of the internal combustion engine 1 will be explained. As shown in FIG. 1, the internal combustion engine 1 is provided with a cylinder 7 in which a fuel-air mixture is combusted. The internal combustion engine 1 is provided with an intake path 23 for supplying air to the cylinders 7 and an exhaust path 17 for discharging exhaust gas from the cylinders 7. The internal combustion engine 1 is a gasoline engine. The internal combustion engine 1 is provided with a throttle valve 4 that opens and closes intake path 23. The throttle valve 4 is an electronically controlled throttle valve which an opening-and-closing drive is carried out with the electric motor controlled by controller 50. A throttle position sensor 19 that outputs an electric signal according to the opening degree of the throttle valve 4 is provided in the throttle valve 4.

An air flow sensor 3 which outputs an electric signal according to an intake air amount taken into intake path 23 is provided in intake path 23 of the upstream of throttle valve 4. The internal combustion engine 1 is provided with an exhaust gas recirculation apparatus 20. The exhaust gas recirculation apparatus 20 has an EGR passage 21 that recirculates exhaust gas from the exhaust path 17 to the intake manifold 12, and an EGR valve 22 that opens and closes the EGR passage 21. The intake manifold 12 is a part of the intake path 23 of downstream side of the throttle valve 4. The EGR valve 22 is an electronic controlled EGR valve which an opening-and-closing drive is carried out with the electric motor controlled by controller 50. In the exhaust path 17, there is provided an air-fuel ratio sensor 18 that outputs an electric signal according to an air-fuel ratio of exhaust gas in the exhaust path 17.

A manifold pressure sensor 8 which outputs an electric signal according to the pressure in the intake manifold 12 is provided in the intake manifold 12. An injector 13 for injecting a fuel is provided at the downstream side part of the intake manifold 12. The injector 13 may be provided in such a way as to inject a fuel directly into the cylinder 7. An atmospheric pressure sensor 33 that outputs an electric signal according to an atmospheric pressure is provided in the internal combustion engine 1.

An ignition plug for igniting a fuel-air mixture and an ignition coil 16 for supplying ignition energy to the ignition plug are provided on the top of the cylinder 7. On the top of the cylinder 7, there are provided an intake valve 14 for adjusting the amount of intake air to be taken from the intake path 23 into the cylinder 7 and an exhaust valve 15 for adjusting the amount of exhaust gas to be exhausted from the cylinder to the exhaust path 17.

As shown in FIG. 2, the internal combustion engine 1 has a plurality of cylinders 7 (in this example, three). A piston 5 is provided inside of the each cylinder 7. The piston 5 of the each cylinder 7 is connected to a crankshaft 2 via a connecting rod 9 and a crank 32. The crankshaft 2 is rotated by reciprocating movement of piston 5. The combustion gas pressure which generated in the each cylinder 7 presses the top face of the piston 5, and rotates the crankshaft 2 via the connecting rod 9 and the crank 32. The crankshaft 2 is connected with a power transfer mechanism which transmits driving force to the wheels. The power transfer mechanism consists of a gearbox, a differential gear and the like.

The internal combustion engine 1 is provided with a signal plate 10 which rotates integrally with the crankshaft 2. A plurality of teeth are provided in the signal plate 10 at a plurality of preliminarily set crank angles. In the present embodiment, the teeth of the signal plate 10 are arranged at intervals of 10 deg. The teeth of the signal plate 10 are provided with a chipped tooth part which chipped a part of teeth. The internal combustion engine 1 is provided with a first crank angle sensor 11 which is fixed to an engine block 24 and detects the tooth of the signal plate 10.

The internal combustion engine 1 is provided with a cam shaft 29 connected with crankshaft 2 by a chain 28. The cam shaft 29 carries out the opening-and-closing drive of the intake valve 14 and the exhaust valve 15. During the crankshaft 2 rotates two times, the cam shaft 29 rotates once. The internal combustion engine 1 is provided with a signal plate 31 for cam which rotates integrally with the cam shaft 29. A plurality of teeth are provided in the signal plate 31 for cam at a plurality of preliminarily set cam shaft angles. The internal combustion engine 1 is provided with a cam angle sensor 30 which is fixed to an engine block 24 and detects the tooth of signal plate 31 for cam.

Based on two kinds of output signals of the first crank angle sensor 11 and the cam angle sensor 30, the controller 50 detects the crank angle on the basis of the top dead center of each piston 5 and determines the stroke of each cylinder 7. The internal combustion engine 1 is a 4-stroke engine which has an intake stroke, a compression stroke, an expansion stroke, and an exhaust stroke.

The internal combustion engine 1 is provided with a flywheel 27 which rotates integrally with the crankshaft 2. The peripheral part of flywheel 27 is a ring gear 25, and a plurality of teeth are provided in the ring gear 25 at a plurality of preliminarily set crank angles. The teeth of the ring gear 25 are arranged in the peripheral direction with equiangular intervals. In this example, 90 teeth are provided with intervals of 4 deg. The teeth of ring gear 25 are not provided with a chipped tooth part. The internal combustion engine 1 is provided with a second crank angle sensor 6 which is fixed to an engine block 24 and detects the tooth of the ring gear 25. The second crank angle sensor 6 is disposed oppositely to the ring gear 25 with a space in radial-direction outside of the ring gear 25. The opposite side of the flywheel 27 to the crankshaft 2 is connected with a power transfer mechanism. Accordingly, the output torque of the internal combustion engine 1 passes through a part of the flywheel 27, and is transmitted to the wheels side.

Each of the first crank angle sensor 11, the cam angle sensor 30, and the second crank angle sensor 6 outputs an electric signal according to change of the distance between each sensor and tooth by rotation of the crankshaft 2. The output signal of each angle sensor 11, 30, 6 becomes a rectangular wave which a signal turns on or off in the case where the distance between sensor and tooth is near or in the case where the distance is far. An electromagnetic pickup type sensor is used for each angle sensor 11, 30, 6, for example.

Since the flywheel 27 (the ring gear 25) has larger number of teeth than the number of teeth of the signal plate 10, and there is also no chipped tooth part, it can expect high resolution angle detection. Since the flywheel 27 has larger mass than the mass of the signal plate 10 and high frequency oscillation is suppressed, it can expect high accuracy of angle detection.

In the present embodiment, the second crank angle sensor 6 corresponds to "a specific crank angle sensor" in the present invention, the flywheel 27 corresponds to the "a rotation member" in the present invention, the tooth of ring gear 25 provided in flywheel 27 corresponds to the "a detected unit" in the present invention, and the engine block 24 corresponds to the "a nonrotation member" in the present invention.

1-2. The Configuration of the Controller 50

Figure 4:
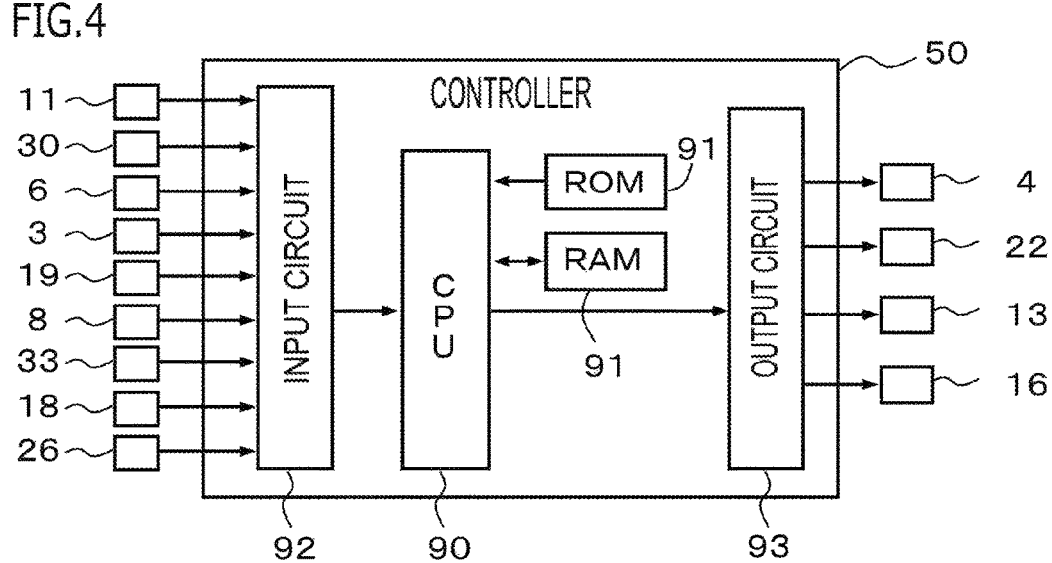
FIG. 4 is a hardware configuration diagram of a controller according to Embodiment 1 of the present invention.

Next, the controller 50 will be explained. The controller 50 is the one whose control subject is the internal combustion engine 1. As shown in FIG. 3, the controller 50 is provided with control units of an angle information calculation unit 51, a torsional torque calculation unit 52, a cylinder internal pressure estimation unit 53, a combustion parameter calculation unit 54, a combustion control unit 55, and the like. The respective control units 51 through 55 and the like of the controller 50 are realized by processing circuits included in the controller 50. Specifically, as shown in FIG. 4, the controller 50 includes, as a processing circuit, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

As the storage apparatuses 91, there are provided a RAM (Random Access Memory) that can read data and write data from the computing processing unit 90, a ROM (Read Only Memory) that can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal from the computing processing unit 90.

In addition, the computing processing unit 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 through 55 included in the controller 50 are realized. Setting data items such as constant values, tables and determination values to be utilized in the control units 51 through 55 are stored, as part of software items (programs), in the storage apparatus 91 such as a ROM. Data items such as a crank angle $\theta d$, a crank angle speed $\omega d$, a crank angle acceleration $\alpha d$, a torsional vibration torque $\Delta Tt$, a combustion gas pressure torque Tb, respective computed values, and respective detection values, which the respective control units 51 through 55 calculated, are stored in the rewritable storage apparatus 91 such as a RAM. In the present embodiment, the input circuit 92 is connected with the first crank angle sensor 11, the cam angle sensor 30, the second crank angle sensor 6, the air flow sensor 3, the throttle position sensor 19, the manifold pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, and the like. The controller 50 is connected with various kinds of unillustrated sensors, switches, actuators, and the like. The controller 50 detects driving conditions of the internal combustion engines 1, such as an intake air amount, a pressure in the intake manifold 12, an atmospheric pressure, an air-fuel ratio, and an accelerator opening degree, based on the output signals of various sensors.

As basic control, the controller 50 calculates a fuel injection amount, an ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates a demanded output torque of the internal combustion engine 1 by the driver, and then controls the throttle valve 4 and the like so that an intake air amount for realizing the demanded output torque is obtained. Specifically, the controller 50 calculates a target throttle opening degree and then performs driving control of the electric motor of the throttle valve 4 so that the throttle opening degree, detected based on the output signal of the throttle position sensor 19, approaches the target throttle opening degree. And the controller 50 calculates a target opening degree of the EGR valve 22 based on inputted output signals and the like from the various kinds of sensors and then performs driving control of the electric motor of the EGR valve 22.

1-2-1. Angle Information Calculation Unit 51

The angle information calculation unit 51 detects a crank angle $\theta d$ based on the output signal of the second crank angle sensor 6 used as the specific crank angle sensor, and calculates a crank angle speed $\omega d$ which is a time change rate of the crank angle $\theta d$, and a crank angle acceleration $\alpha d$ which is a time change rate of the crank angle speed $\omega d$. In the present embodiment, the angle information calculation unit 51 is provided with an angle information detection unit 60, an angle information correction unit 61, and an after-correction angle information calculation unit 62, and corrects an error of the angle information caused by production variation of the teeth of the ring gear 25 and the like.

<Angle Information Detection Unit 60>

Figure 5:
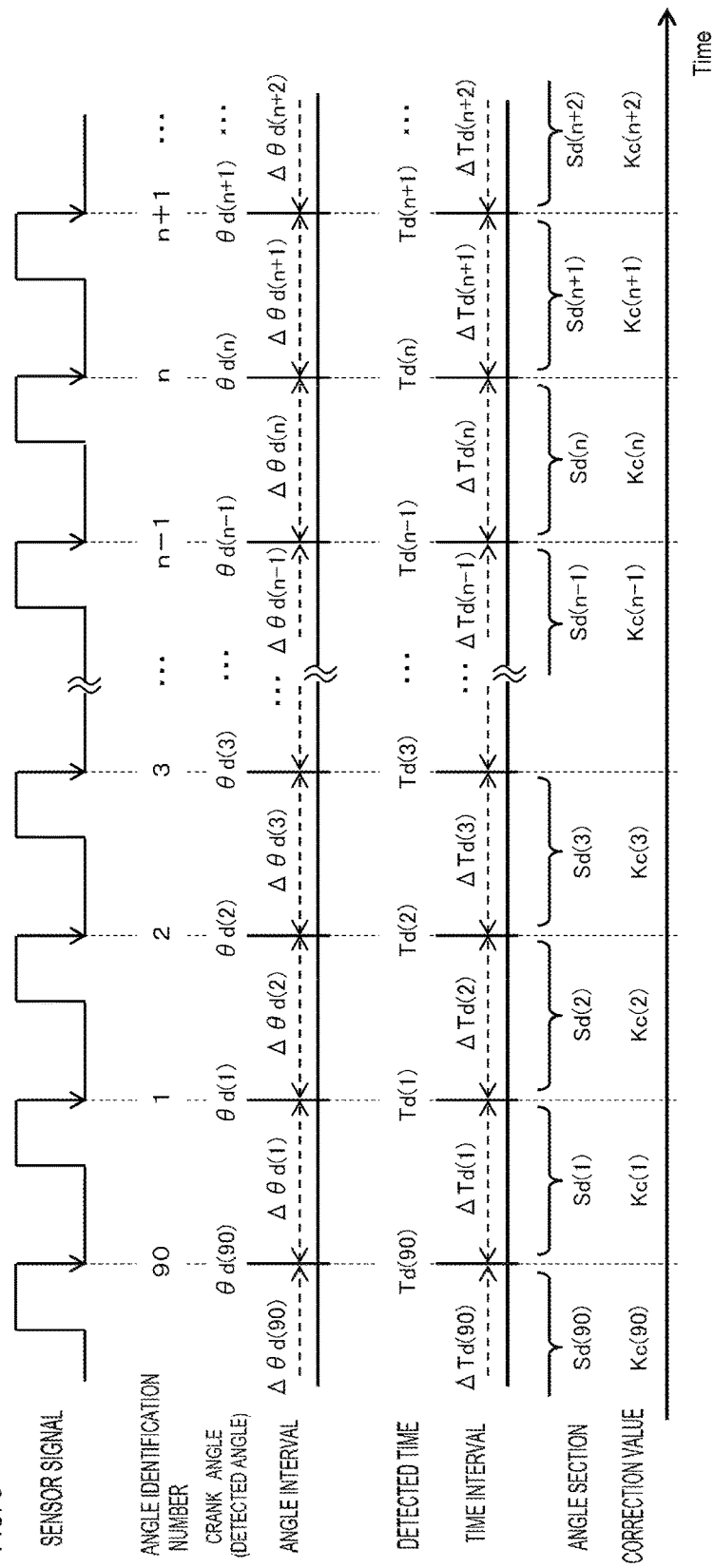
FIG. 5 is a time chart for explaining an angle information detection processing according to Embodiment 1 of the present invention.

As shown in FIG. 5, the angle information detection unit 60 detects a crank angle $\theta d$ based on the output signal of the second crank angle sensor 6 and detects a detected time Td which detected the crank angle $\theta d$. And based on a detected angle $\theta d$, which is the detected crank angle $\theta d$, and the detected time Td, the angle information detection unit 60 calculates an angle interval $\Delta\theta d$ and a time interval $\Delta Td$ corresponding to an angle section Sd between the detected angles $\theta d$.

In the present embodiment, the angle information detection unit 60 determines the crank angle $\theta d$ when falling edge (or rising edge) of the output signal (rectangular wave) of the second crank angle sensor 6 is detected. The angle information detection unit 60 determines a basing point falling edge which is a falling edge corresponding to a basing point angle (for example, 0 deg which is a top dead center of the piston 5 of the first cylinder #1), and determines the crank angle $\theta d$ corresponding to number n of the falling edge which is counted up on the basis of the basing point falling edge (hereinafter, referred to as an angle identification number n). For example, when the basing point falling edge is detected, the angle information detection unit 60 sets the crank angle $\theta d$ to the basing point angle (for example, 0 deg), and sets the angle identification number n to 0. And every time the falling edge is detected, the angle information detection unit 60 increases the crank angle $\theta d$ by a preliminarily set angle interval $\Delta\theta d$ (in this example, 4 deg) and increases the angle identification number n by one. Alternatively, the angle information detection unit 60 may read out the crank angle $\theta d$ corresponding to the this time identification number n, by use of an angle table in which the relationship between the identification number n and the crank angle $\theta d$ is preliminarily set. The angle information detection unit 60 correlates the crank angle $\theta d$ (the detected angle $\theta d$) with the angle identification number n. The angle identification number n returns to 1 after a maximum number (in this example, 90). The last time angle identification number n of the angle identification number n=1 is 90, and the next time angle identification number n of the angle identification number n=90 is 1.

In the present embodiment, as described later, the angle information detection unit 60 determines the basing point falling edge of the second crank angle sensor 6 with reference to a reference crank angle $\theta r$ detected based on the first crank angle sensor 11 and the cam angle sensor 30. For example, the angle information detection unit 60 determines the falling edge of the second crank angle sensor 6, which the reference crank angle $\theta r$, becomes the closest to the basing point angle, as the basing point falling edge.

The angle information detection unit 60 determines the stroke of respective cylinders 7 corresponding to the crank angle $\theta d$ with reference to the stroke of respective cylinders 7 determined based on the first crank angle sensor 11 and the cam angle sensor 30.

The angle information detection unit 60 detects a detected time Td at the time that the falling edge of the output signal (rectangular wave) of the second crank angle sensor 6 is detected, and correlates the detected time Td with the angle identification number n. Specifically, the angle information detection unit 60 detects the detected time Td using the timer function provided in the computing processing unit 90.

As shown in FIG. 5, when a falling edge is detected, the angle information detection unit 60 sets the angle section between the detected angle $\theta d$ (n) corresponding to the this time angle identification number (n) and the detected angle $\theta d$ (n−1) corresponding to the last time angle identification number (n−1), as the angle section Sd (n) corresponding to the this time angle identification number (n).

As shown in an equation (1), when a falling edge is detected, the angle information detection unit 60 calculates the deviation between the detected angle $\theta d$ (n) corresponding to the this time angle identification number (n) and the detected angle $\theta d$ (n−1) corresponding to the last time angle identification number (n−1), and sets the calculated deviation as the angle interval $\Delta\theta d$ (n) corresponding to the this time angle identification number (n) (the this time angle section Sd (n)).

$$\Delta\theta d(n)=\theta d(n)-\theta d(n-1) \qquad (1)$$

In the present embodiment, since all the angle intervals of the tooth of ring gear 25 are made equal, the angle information detection unit 60 sets the angle interval $\Delta\theta d$ of all the angle identification numbers n as a preliminarily set angle (in this example, 4 deg).

As shown in an equation (2), when a falling edge is detected, the angle information detection unit 60 calculates the deviation between the detected time Td (n) corresponding to the this time angle identification number (n) and the detected time Td (n−1) corresponding to the last time angle identification number (n−1), and sets the calculated deviation as the time interval $\Delta Td$ (n) corresponding to the this time angle identification number (n) (the this time angle section Sd (n)).

$$\Delta Td(n) = Td(n) - Td(n-1) \tag{2}$$

Based on two kinds of output signals of the first crank angle sensor 11 and the cam angle sensor 30, the angle information detection unit 60 detects the reference crank angle $\theta r$ on the basis of the top dead center of the piston 5 of the first cylinder #1, and determines the stroke of each cylinder 7. For example, the angle information detection unit 60 determines the falling edge just after the chipped tooth part of the signal plate 10 based on the time interval of the falling edge of the output signal (rectangular wave) of the first crank angle sensor 11. And the angle information detection unit 60 determines the correspondency between the each falling edge on the basis of the falling edge just after the chipped tooth part, and the reference crank angle $\theta r$ on the basis of the top dead center, and calculates the reference crank angle $\theta r$ on the basis of the top dead center at the time that the each falling edge is detected. The angle information detection unit 60 determines the stroke of each cylinder 7 based on the relationship between the position of the chipped tooth part in the output signal (rectangular wave) of the first crank angle sensor 11, and the output signal (rectangular wave) of the cam angle sensor 30.

<Angle Information Correction Unit 61>

The angle information correction unit 61 corrects the angle interval $\Delta\theta d$ or the time interval $\Delta Td$ in each of the angle sections Sd by a correction value Kc provided one corresponding to each of the angle sections Sd. This correction value Kc is for compensating for tiny variation of the angle interval of the teeth of the ring gear 25. If it is before attaching the ring gear 25 to the internal combustion engine 1, for example, using the ratio of the time interval $\Delta Td$ in each of the angle sections Sd to an average time interval when rotating the ring gear 25 with constant speed alone, the correction value Kc in each of the angle sections Sd is calculated previously, and it is memorized and used. If it is after attaching the ring gear 25 to the internal combustion engine 1, for example, under the condition which the internal combustion engine 1 is rotating with constant speed such as during fuel cut, the correction value Kc in each of the angle sections Sd may be calculated by changing so that the angular acceleration change amount which is a time change amount of the crank angle acceleration $\alpha d$ calculated based on the angle interval $\Delta\theta d$ and the time interval $\Delta Td$, or the crank angle jerk which is a time change rate of the crank angle acceleration $\alpha d$ approaches zero.

Figures 6, 7:
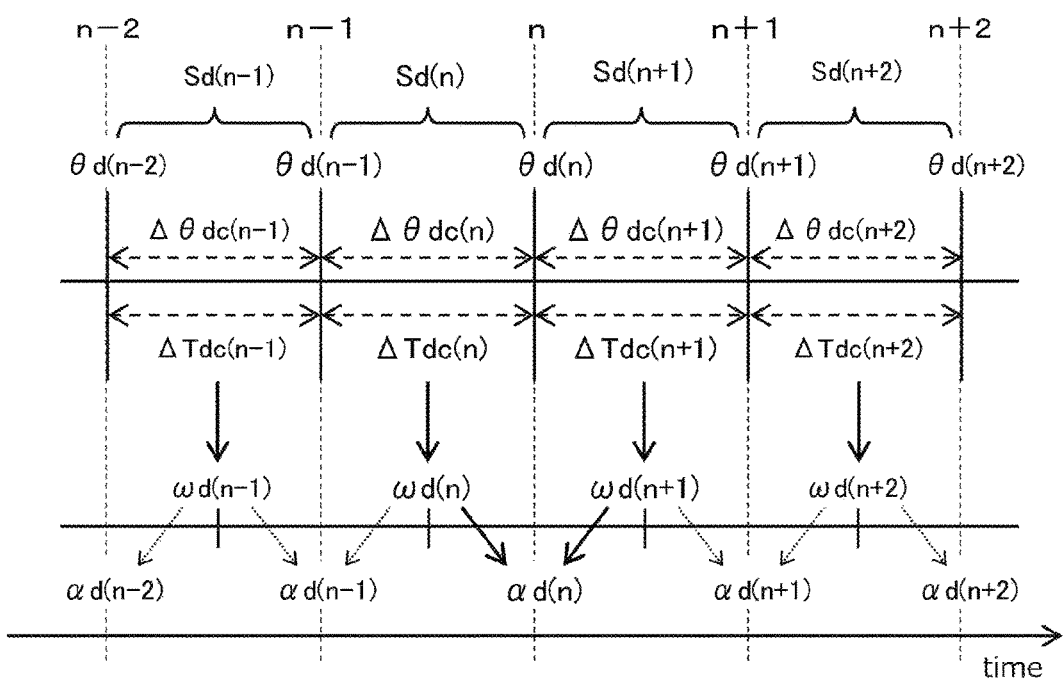
FIG. 6 is a figure for explaining a correction value stored in a storage apparatus according to Embodiment 1 of the present invention.
FIG. 7 is a time chart for explaining an angle information calculation processing according to Embodiment 1 of the present invention.

In the present embodiment, the angle information correction unit 61 provides one correction value Kc (n) in the every angle section Sd (n) of the each angle identification number n. In this example, since the angle identification number n and the angle section Sd are provided 90, the correction value Kc is also provided 90. As shown in FIG. 6, the each correction value Kc is correlated with the each angle identification number n, and is stored in the rewritable storage apparatus 91 such as RAM of the controller 50.

As shown in an equation (3), the angle information correction unit 61 multiplies the correction value Kc (n) corresponding to the this time angle identification number (n) to the angle interval $\Delta\theta d$ (n) or the time interval $\Delta Td$ (n) corresponding to the this time angle identification number (n), so as to calculate the corrected angle interval $\Delta\theta dc$ (n) or the corrected time interval $\Delta Tdc$ (n) corresponding to the this time angle identification number (n).

$$\Delta\theta dc(n) = Kc(n) \times \Delta\theta d(n)$$

or $$\Delta Tdc(n) = Kc(n) \times \Delta Td(n) \tag{3}$$

In the present embodiment, the case where the time interval $\Delta Td$ is corrected by the correction value Kc is explained. The angle interval $\Delta\theta d$ which is not corrected by the correction value Kc is also called as the corrected angle interval $\Delta\theta dc$, for convenience of explanation.

<After-Correction Angle Information Calculation Unit 62>

Based on the corrected angle interval $\Delta\theta dc$ and the corrected time interval $\Delta Tdc$ by the correction value Kc in each of the angle sections Sd, the after-correction angle information calculation unit 62 calculates a crank angle speed $\omega d$ which is a time change rate of the crank angle $\theta d$, and a crank angle acceleration $\alpha d$ which is a time change rate of the crank angle speed $\omega d$, corresponding to each of the detected angles $\theta d$ or the angle sections Sd.

In the present embodiment, as shown in FIG. 7, based on the corrected angle interval $\Delta\theta dc$ (n) and the corrected time interval $\Delta Tdc$ (n) corresponding to the angle section Sd (n) made into a processing object, the after-correction angle information calculation unit 62 calculates the crank angle speed $\omega d$ (n) corresponding to the angle section Sd (n) of the processing object. Specifically, as shown in an equation (4), the after-correction angle information calculation unit 62 calculates the crank angle speed $\omega d$ (n) by dividing the corrected angle interval $\Delta\theta dc$ (n) by the corrected time interval $\Delta Tdc$ (n) corresponding to the angle section Sd (n) of the processing object.

$$\omega d(n) = \Delta\theta dc(n) / \Delta Tdc(n) \tag{4}$$

Based on the crank angle speed $\omega d$ (n) and the corrected time interval $\Delta Tdc$ (n), corresponding to the just before one angle section Sd (n) of the detected angle $\theta d$ (n) made into a processing object, and the crank angle speed $\omega d$ (n+1) and the corrected time interval $\Delta Tdc$ (n+1), corresponding to the just after one angle section Sd (n+1) of the detected angle $\theta d$ (n) of the processing object, the after-correction angle information calculation unit 62 calculates the crank angle acceleration $\alpha d$ (n) corresponding to the detected angle $\theta d$ (n) of the processing object. Specifically, as shown in an equation (5), the after-correction angle information calculation unit 62 calculates the crank angle acceleration $\alpha d$ (n) by dividing the subtraction value, which subtracted the just before crank angle speed $\omega d$ (n) from the just after crank angle speed $\omega d$ (n+1), by an average value of the just after corrected time interval $\Delta Tdc$ (n+1) and the just before corrected time interval $\Delta Tdc$ (n).

$$\alpha d(n) = \{\omega d(n+1) - \omega d(n)\} / \{\Delta Tdc(n+1) + \Delta Tdc(n)\} \times 2 \tag{5}$$

The angle information correction unit 61 and the after-correction angle information calculation unit 62 correct, in real time, the angle interval $\Delta\theta d$ or the time interval $\Delta Td$, which calculated in real time, by the correction value Kc, and calculate the crank angle speed $\omega d$ and the crank angle acceleration $\alpha d$ in real time. The after-correction angle information calculation unit 62 performs a low pass filter processing to the corrected time interval ΔTdc or the crank angle acceleration αd, in order to reduce a noise component of high frequency. Each part of the angle information calculation unit 51 memorizes each calculated angle information to the storage apparatus 91.

1-2-2. Torsional Torque Calculation Unit 52

<Influence of Torsional Torque>

In the present embodiment, as described later, the cylinder internal pressure estimation unit 53 calculates the combustion gas pressure torque Tb which was produced by combustion based on the crank angle acceleration αd and the like, and estimates the cylinder internal pressure Pcylb of the combustion cylinder based on the combustion gas pressure torque Tb and the like. As shown in FIG. 2, since it is a part 70 of the crankshaft 2 connected with the piston 5 (hereinafter, referred to the piston connecting shaft part 70) that the combustion gas pressure torque Tb is transmitted, in order to accurately calculate the combustion gas pressure torque Tb, it is preferable to detect the crank angle acceleration αd of the piston connecting shaft part 70. However, the second crank angle sensor 6 is provided in the part of the flywheel 27 which is distant from the piston connecting shaft part 70, and detects the crank angle acceleration αd of the flywheel 27.

In a connection crankshaft part 71 which is a part of the crankshaft 2 which connects the piston connecting shaft part 70 and the flywheel 27, torsion is produced. Then, the combustion gas pressure torque Tb transmitted to the piston connecting shaft part 70 is transmitted to the flywheel 27 by torsion of the connection crankshaft part 71. Since the combustion gas pressure torque Tb is doing the cycle variation, in the connection crankshaft part 71, torsional vibration is produced. Accordingly, the combustion gas pressure torque Tb transmitted to the flywheel 27 is varied from the combustion gas pressure torque Tb transmitted to the piston connecting shaft part 70 by a vibration component of torsional torque (torsional vibration torque ΔTt), there has been a problem that an error is produced in the combustion gas pressure torque Tb calculated based on the crank angle acceleration αd of the flywheel 27.

For this reason, in the present embodiment, as described later, the torsional vibration torque ΔTt is calculated by the torsional torque calculation unit 52, and the cylinder internal pressure estimation unit 53 calculates the combustion gas pressure torque Tb with consideration of the torsional vibration torque ΔTt. Hereinafter, the details of the torsional torque calculation unit 52 and the cylinder internal pressure estimation unit 53 will be explained.

<Principle of Calculation of Torsional Vibration Torque ΔTt>

First, the principle of calculation of the torsional vibration torque ΔTt is explained. As described above, in the technology of JP-A-2004-340878, as shown in the paragraph 0026 and FIG. 7 of JP-A-2004-340878, since it is necessary to solve the equation of motion of many inertia systems of the number of cylinders and the flywheel and it is very complicated, it considers simplifying this.

Figure 8:
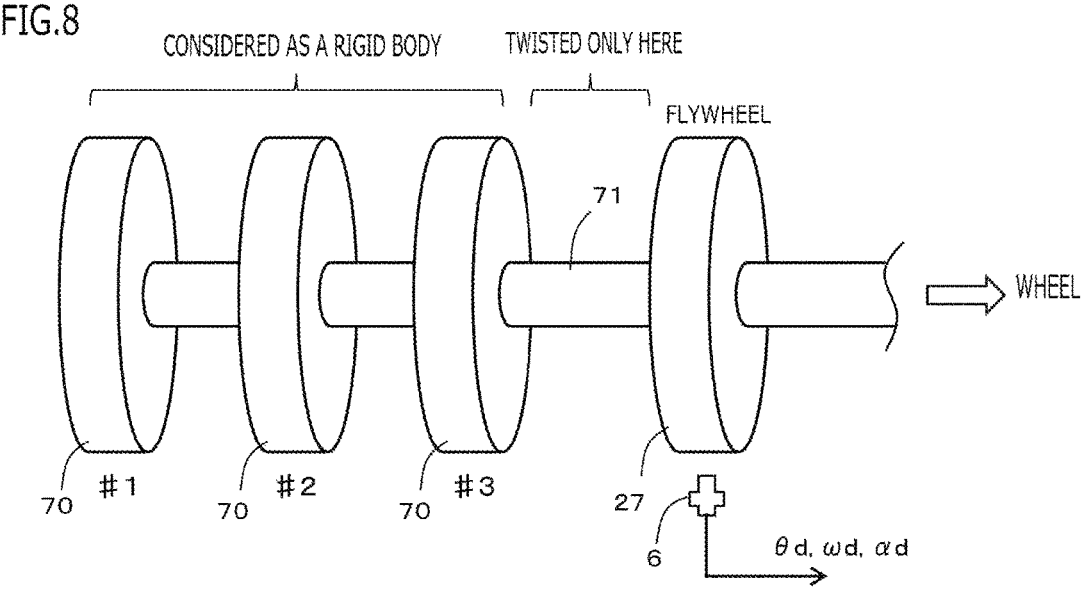
FIG. 8 is a figure which simplified a crankshaft according to Embodiment 1 of the present invention.
Figure 9:
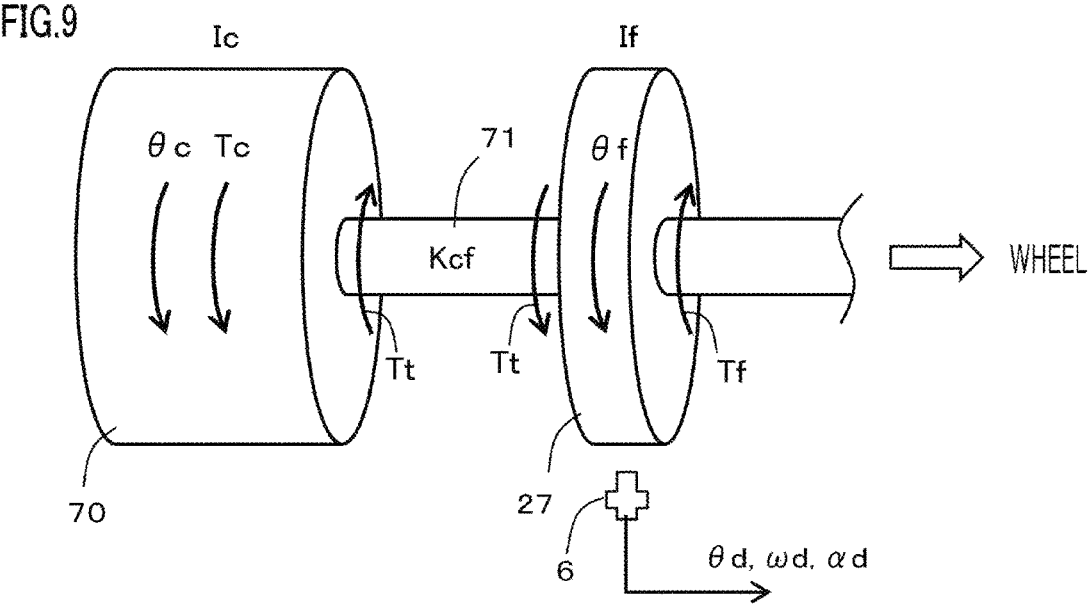
FIG. 9 is a figure which simplified a crankshaft according to Embodiment 1 of the present invention.

In the present embodiment, as shown in FIG. 8 and FIG. 9 which picked out only the crankshaft 2 part in FIG. 2 and simplified, it is simplified by assuming that torsion does not occur between the piston connecting shaft parts 70 of each cylinder (in this example, the first cylinder #1, the second cylinder #2, and the third cylinder #3), and assuming that the piston connecting shaft parts 70 of each cylinder are one rigid body. Then, as shown in an equation (6), it can be simplified to an equation of motion of two inertia systems which torsion is produced in the connection crankshaft part 71, which connects between an inertia of the piston connecting shaft parts 70 of each cylinder assumed as one rigid body and an inertia of the flywheel 27.

$$Ic\frac{d^2\theta c}{dt^2} = Tc - Tt \quad (6)$$

$$If\frac{d^2\theta f}{dt^2} = Tt - Tf$$

$$Tt = kcf(\theta c - \theta f)$$

Here, θc is a rotational angle of the piston connecting shaft part 70. θf is a rotational angle of the flywheel 27 and is a detection object of the second crank angle sensor 6. Ic is an inertia moment of the piston connecting shaft parts 70, and If is an inertia moment of the flywheel 27. Tc is a piston connecting part input torque such as gas pressure torque of the combustion cylinder and the unburnt cylinders, and the piston inertia torque, which are transmitted to the piston connecting shaft part 70 from the pistons 5 and the like; Tf is an external output torque transmitted to the power transfer mechanism side from the flywheel 27. Tt is a torsional torque which is produced by torsion of the connection crankshaft part 71, and becomes a value which multiplied a torsional spring constant Kcf of the connection crankshaft part 71 to a torsional angle φ (=θc−θf) which is a difference between the rotational angle θc of the piston connecting shaft part 70 and the rotational angle θf of the flywheel 27.

If the equation (6) is solved, a solution considering the torsion around the simplified crankshaft can be obtained, but in the equation (6), since θc, and an angular difference (θc−θf) between θc and θf are undetectable, it cannot be solved. Then, the further simplification is considered. An equation (7) can be obtained if each side of the first equation and each side of the second equation of the equation (6) are added mutually.

$$Ic\frac{d^2\theta c}{dt^2} + If\frac{d^2\theta f}{dt^2} + Tc - Tf \quad (7)$$

Here, since the angular difference of θc and θf is tiny, it is assumed that the rotational angle θc of the piston connecting shaft parts 70 coincides with the rotational angle θf of the flywheel 27. The piston connecting part input torque Tc is assumed to be a produced torque Tg (cylinder internal pressure torque+inertia torque), and the external output torque Tf is assumed to be an external load torque Tex (friction+auxiliary machine load+running resistance). Inertia moment of all rotation systems of the members which rotate integrally with the crankshaft 2, which summed the inertia moment Ic of the piston connecting shaft parts 70 and the inertia moment If of the flywheel 27, is set to Io. By modifying the equation (7) by these, an equation of a rigid body component which is not taking torsion into consideration like an equation (8) is obtained.

$$Io\frac{d^2\theta f}{dt^2} = Tg - Tex \quad (8)$$

$$(\because Io = Ic + If, \theta c = \theta f, Tc = Tg, Tf = Tex)$$

Next, after dividing the first equation of the equation (6) by the inertia moment Ic of the piston connecting shaft parts 70 and dividing the second equation by the inertia moment If of the flywheel 27, by subtracting mutually each side of the first equation and each side of the second equation of the equation (6), an equation (9) is obtained.

$$\frac{d^2\theta c}{dt^2} = \frac{Tc}{Ic} - \frac{kcf}{Ic}(\theta c - \theta f) \tag{9}$$

$$\frac{d^2\theta f}{dt^2} = \frac{kcf}{Ic}(\theta c - \theta f) - \frac{Tf}{If}$$

$$\Rightarrow \frac{d^2\theta c}{dt^2} - \frac{d^2\theta f}{dt^2} = \frac{Tc}{Ic} + \frac{Tf}{If} - \left(\frac{1}{Ic} + \frac{1}{If}\right)kcf(\theta c - \theta f)$$

$$\therefore \frac{d^2\phi}{dt^2} + \frac{kcf}{Icf}\phi = Tcf$$

$$\left(\because \phi = \theta c - \theta f, \frac{1}{Icf} = \frac{1}{Ic} + \frac{1}{If}, Tcf = \frac{Tc}{Ic} + \frac{Tf}{If}\right)$$

The equation (9) is an equation of torsional angle $\varphi(=\theta c-\theta f)$ of the connection crankshaft part 71, and this general solution becomes like an equation (10).

$$\varphi = A\cdot\sin(\omega n\cdot t) + B\cdot\cos(\omega n\cdot t) + C \tag{10}$$

By substituting the equation (10) for the equation (9), a natural angular frequency $\omega n$ and an integration constant C are obtained like an equation (11).

$$-A\cdot\omega n^2\cdot\sin(\omega n\cdot t) - B\cdot\omega n^2\cdot\cos(\omega n\cdot t) + \tag{11}$$

$$\frac{kcf}{Icf}\{A\cdot\sin(\omega n\cdot t) + B\cdot\cos(\omega n\cdot t) + C\} = Tcf$$

$$\Rightarrow \left(-\omega n^2 + \frac{kcf}{Icf}\right)\{A\cdot\sin(\omega n\cdot t) + B\cdot\cos(\omega n\cdot t)\} + \left(\frac{kcf}{Icf}C - Tcf\right) = 0$$

$$\Rightarrow \omega n^2 = \frac{kcf}{Icf}, \frac{kcf}{Icf}C = Tcf \Rightarrow \therefore \omega n = \sqrt{\frac{kcf}{Icf}}, C = Tcf\frac{Icf}{kcf}$$

In this way, the integration constant C is constant value and it is thought that this is a constant torsional angle for transmitting an average torque of the crankshaft 2. As an initial condition, assuming that at time t=0, the torsional angle $\varphi$ is at the top of mountain of torsional vibration by the maximum value of the piston connecting part input torque, such as the combustion gas pressure torque, by setting $d\varphi/dt=0$, setting an amplitude of torsional vibration to $\Delta\varphi0$, and setting $\varphi=\Delta\varphi0+C$, A and B of the equation (10) are derived like an equation (12).

$$\phi = A\cdot\sin(0) + B\cdot\cos(0) + C = B + C = \Delta\phi0 + C \tag{12}$$

$$\frac{d\phi}{dt} = A\cdot\omega n\cdot\cos(0) - B\cdot\omega n\cdot\sin(0) = A\cdot\omega n = 0$$

$$\therefore A = 0, B = \Delta\phi0$$

The equation (10) which is the solution of the equation (9) becomes like an equation (13) from the equation (11) and the equation (12).

$$\phi = \Delta\phi0\cdot\cos(\omega n\cdot t) + C \tag{13}$$

$$\left(\because \omega n = \sqrt{\frac{kcf}{Icf}}, C = Tcf\frac{Icf}{kcf}\right)$$

Here, based on the solution of torsional angle $\varphi$ derived by the equation (13), the torsional torque Tt which is produced by torsional angle $\varphi$ is calculated. By setting torque required to twist by the amplitude $\Delta\varphi0$ of torsional vibration, which becomes torsional angle $\varphi$ of the initial condition (t=0), to $\Delta Tt0$, the torsional torque Tt becomes like an equation (14).

$$Tt = kcf\cdot\phi = kcf\cdot\Delta\phi0\cdot\cos(\omega n\cdot t) + kcf\cdot C = \Delta Tt0\cdot\cos(\omega n\cdot t) + kcf\cdot C$$

$$(\because \Delta Tt0 = kcf\cdot\Delta\phi0) \tag{14}$$

The torsional vibration torque $\Delta Tt$, which is a vibration component of the torsional torque Tt on the basis of the initial condition (t=0) in which torsional angle $\varphi$ is twisted to the maximum, becomes like an equation (15).

$$\Delta Tt = \{\Delta Tt0\cdot\cos(\omega n\cdot t) + kcf\cdot C\} - (\Delta Tt0 + kcf\cdot C) \tag{15}$$

$$= \Delta Tt0\{\cos(\omega n\cdot t) - 1\}$$

By supposing that the connection crankshaft part 71 twists to the maximum by the maximum torque which is produced in combustion, the amplitude $\Delta Tt0$ of torsional vibration torque of the equation (15) can be calculated based on the angular acceleration of the flywheel 27. Specifically, as shown in an equation (16), a maximum value $\Delta Tt\text{max}$ of torsional vibration torque which calculated by multiplying a mutual inertia moment Icf to the maximum value of the angular acceleration of the flywheel 27 in the combustion period can be calculated as the amplitude $\Delta Tt0$ of torsional vibration torque.

$$\Delta Tt0 = \Delta Tt\text{max} = Icf\cdot\max\left(\frac{d^2\theta f}{t^2}\right) \tag{16}$$

$$\left(\because Icf = \frac{Ic\cdot If}{Ic + If}\right)$$

Here, max( ) is a function which extracts the maximum value from the angular acceleration in the combustion period. The mutual inertia moment Icf is a value which divided a multiplication value of the inertia moment Ic of the piston connecting shaft part 70 and the inertia moment If of the flywheel 27 by an additional value of the inertia moment Ic of the piston connecting shaft part 70 and the inertia moment If of the flywheel 27.

If it supposes that torsional vibration torque $\Delta Tt$ of the equation (15) which is a solution of the equation (9) with consideration of torsion is added to the equation (8) of the rigid body without consideration of torsion, the equation (17) which is an equation of motion of the crankshaft 2 with consideration of torsion can be obtained. The equation (17) is the same form as the equation (20) described later. In an equation (17), the torsional vibration torque $\Delta Tt$ becomes a negative value, and expresses that the torque transmitted to the flywheel 27 from the piston connecting shaft part 70 decreases by the torsional vibration torque $\Delta Tt$ from the produced torque Tg, by decreasing the torsional angle $\varphi$ by twist return of torsional vibration from the state where the connection crankshaft part 71 is twisting to the maximum by the maximum torque in combustion.

$$I0\frac{d^2\theta f}{dt^2} = Tg - Tex + \Delta Tt \quad (17)$$

1) In the case of $t \leq 0$ $\Delta Tt = 0$

2) In the case of $t > 0$ $\Delta Tt = \Delta Tt\max\{\cos(\omega n \cdot t) - 1\}$ $$\left( \because \omega n = \sqrt{\frac{kcf}{Icf}}, Icf = \frac{Ic \cdot If}{Ic + If} \right)$$

<Configuration of the Torsional Torque Calculation Unit 52>

The torsional torque calculation unit 52 is configured based on the above derivation result. As shown in the equation (17), the torsional vibration torque ΔTt can be expressed by a value which has an amplitude of the maximum value ΔTtmax of torsional vibration torque and vibrates with the natural angular frequency ωn. Then, the torsional torque calculation unit 52 calculates the maximum value ΔTtmax of torsional vibration torque which is a vibration component of torsional torque produced by torsion of the crankshaft 2, based on the crank angle acceleration αd in the combustion period. And the torsional torque calculation unit 52 calculates, as the torsional vibration torque ΔTt in the combustion period, a value which has an amplitude of the maximum value ΔTtmax of torsional vibration torque and vibrates with a preliminarily set natural angular frequency ωn of torsional vibration.

According to this configuration, since the maximum value ΔTtmax of torsional vibration torque which becomes the amplitude of torsional vibration torque ΔTt is varied every combustion, it is calculated based on the crank angle acceleration αd. On the other hand, as seen from the equation derivation mentioned above, since the natural angular frequency ωn of torsional vibration becomes a predetermined value, it is preliminarily set. Then, the value which has the amplitude of the maximum value ΔTtmax of torsional vibration torque and vibrates with the natural angular frequency ωn is calculated as the torsional vibration torque ΔTt in the combustion period. Therefore, without solving the equation of motion of a plurality of inertia systems, by simple calculation using the knowledge obtained from the equation derivation, the torsional vibration torque ΔTt can be accurately calculated.

The torsional torque calculation unit 52 calculates a basic vibration waveform which starts vibration from a vibration start crank angle which is set in the combustion period, using a preliminarily set vibration waveform which vibrates with the natural angular frequency ωn. And, the torsional torque calculation unit 52 calculates a value which has an amplitude of the maximum value ΔTtmax of torsional vibration torque and vibrates with the basic vibration waveform, as the torsional vibration torque ΔTt in the combustion period.

According to this configuration, as seen from the equation derivation mentioned above, since it can be predicted that the vibration waveform of the torsional vibration torque ΔTt becomes a predetermined vibration waveform, the basic vibration waveform is calculated using the preliminarily set vibration waveform which vibrates with the preliminarily set natural angular frequency ωn. Then, the value which has the amplitude of the maximum value ΔTtmax of torsional vibration torque and vibrates with the basic vibration waveform is calculated as the torsional vibration torque ΔTt. Therefore, using the knowledge obtained from the equation derivation, calculation can be simplified.

The torsional torque calculation unit 52 calculates, as the torsional vibration torque ΔTt, a component of the torsional torque which decreases by decreasing the torsional angle of the crankshaft 2 by twist return from the state where the crankshaft 2 was twisted to the maximum by the maximum torque in combustion.

According to this configuration, by calculating the torsional vibration torque ΔTt by twist return, the calculation part of the torsional vibration torque ΔTt can be narrowed down, and the simplification of calculation and the calculation accuracy of the torsional vibration torque ΔTt can be improved like the above-mentioned equation derivation.

The torsional torque calculation unit 52 calculates the torsional vibration torque ΔTt using a calculation equation of an equation (18).

$$\Delta Tt = \Delta Tt\max \cdot \{\cos(\omega n \cdot t) - 1\} \quad (18)$$

$$\left( \because \omega n = \sqrt{\frac{kcf}{Icf}} \right)$$

Here, t is time after a vibration start crank angle, and is set to 0 at the vibration start crank angle. The torsional torque calculation unit 52 sets the torsional vibration torque ΔTt before the vibration start crank angle to zero. The natural angular frequency ωn may be adjusted by matching so that the torsional vibration torque ΔTt becomes well.

According to this configuration, by setting a trigonometric function, which sets a multiplication value of the natural angular frequency ωn and the time t after the vibration start crank angle as an argument, to the basic vibration waveform, and multiplying the maximum value ΔTtmax of torsional vibration torque to the basic vibration waveform of the trigonometric function, the torsional vibration torque ΔTt can be accurately calculated by the simple calculation equation based on the derivation result of the above-mentioned equation (17). By this equation (18), as is the case with the equation (17), the torsional vibration torque ΔTt becomes a negative value, and can express that the torque transmitted to the flywheel 27 from the crankshaft 2 decreases by the torsional vibration torque ΔTt, by decreasing the torsional angle by twist return of torsional vibration from the state where the crankshaft 2 is twisting to the maximum by the maximum torque in combustion.

The torsional torque calculation unit 52 calculates the torsional vibration torque ΔTt based on the equation (18) during the period until the combustion period ends from the time t=0, and sets the torsional vibration torque ΔTt to zero during the other period. The end time of the combustion period is set to the end time of the expansion stroke.

As shown in an equation (19), the torsional torque calculation unit 52 calculates a value which multiplied a preliminarily set conversion constant Ccf to the maximum value of crank angle acceleration αd in the combustion period, as the maximum value ΔTtmax of torsional vibration torque. max( ) is a function which extracts the maximum value from the crank angle acceleration αd in the combustion period. The combustion period is set to the latter half of the compression stroke, and the expansion stroke.

$$\Delta T t \max = C c f \cdot \max(\alpha d) \quad (19)$$

$$\left( \because C c f = \frac{Ic \cdot If}{Ic \cdot If} \right)$$

The conversion constant Ccf is set to the above-mentioned mutual inertia moment Icf, and set to a value which divided a multiplication value of the inertia moment Ic of the piston connecting shaft part 70 and the inertia moment If of the flywheel 27 by an additional value of the inertia moment Ic of the piston connecting shaft part 70 and the inertia moment If of the flywheel 27. The conversion constant Ccf may be adjusted by matching so that the torsional vibration torque ΔTt becomes well.

The vibration start crank angle is set to a crank angle between the top dead center of the combustion cylinder, and a crank angle (hereinafter, referred to a maximum torque angle) at which torsional vibration torque becomes the maximum value ΔTtmax. The maximum torque angle becomes a crank angle θd corresponding to the extracted maximum value of the crank angle acceleration αd in the equation (19). The torsional torque calculation unit 52 sets the vibration start crank angle in accordance with the maximum torque angle calculated by the equation (19). For example, the torsional torque calculation unit 52 sets, as the vibration start crank angle, a value which multiplied a setting coefficient, which is preliminarily set to a value of more than or equal to 0 and less than or equal to 1, to the maximum torque angle on the basis of the top dead center (0 degree). Alternatively, the vibration start crank angle may be set to a preliminarily set crank angle which becomes between the top dead center of the combustion cylinder, and the maximum torque angle. The vibration start crank angle is adjusted by matching so that the torsional vibration torque ΔTt becomes well.

After end of the combustion period, based on information such as the crank angle acceleration αd in the combustion period stored in the storage apparatus 91, the torsional torque calculation unit 52 calculates the maximum value ΔTtmax of torsional vibration torque, and the torsional vibration torque ΔTt of the each crank angle θd, and stores them to the storage apparatus 91.

1-2-3. Cylinder Internal Pressure Estimation Unit 53

The cylinder internal pressure estimation unit 53 calculates a combustion gas pressure torque Tb which is generated by combustion, by use of an equation of motion of a rotation system of the crankshaft 2 containing piston 5, connecting rod 9, and crank 32 of the internal combustion engine 1, based on the crank angle θd, the crank angle acceleration αd, and the torsional vibration torque ΔTt; and estimates a cylinder internal pressure Pcylb of the cylinder b which is burning, based on the combustion gas pressure torque Tb and the crank angle θd.

The equation of motion of the rotation system of the crankshaft 2 containing piston 5, connecting rod 9, and crank 32 of the internal combustion engine 1 can be expressed by an equation (20) from the equation (17) and the like.

$$Io \cdot \alpha d = Tg - Tex + \Delta Tt \quad (20)$$

$$\because Tg = \sum_{j=1}^{L} \{(Pcyl_j \cdot Sp + mp \cdot \alpha p_j) \cdot R_j\}$$

$$R_j = r \cdot (\sin\theta d_j + \tan\varphi_j \cdot \cos\theta d_j)$$

Here, Io is the inertia moment of the members that rotate integrally with the crankshaft 2; Tg is the produced torque which consists of the cylinder internal pressure torque and the piston inertia torque; Tex is an external load torque transmitted to the crankshaft 2 from outside, such as friction, load of auxiliary machine, and driving resistance; and ΔTt is the torsional torque. Pcylj used for calculation of Tg is the cylinder internal pressure of the j-th cylinder 7; Sp is a project area of a top face of the piston 5; mp is a mass of the piston 5; αpj is an acceleration of the piston 5 of the j-th cylinder 7; Rj is a conversion factor which converts a force which generated at the piston 5 of the j-th cylinder 7 into a torque around the crankshaft 2; L is a number of the cylinders, and L is three (L=3) in the present embodiment. r is a radius of the crank 32; θdj is a crank angle on the basis of the top dead center of the piston 5 of the j-th cylinder 7; ψj is an angle of the connecting rod 9 of the j-th cylinder 7, and is calculated based on a connecting rod ratio which is a ratio of crank length and connecting rod length, and the crank angle θdj.

In the case where the b-th cylinder 7 is in the latter half of the compression stroke and the expansion stroke, and combustion is performed, the equation (20) can be transformed like an equation (21). Here, Pcylb is the cylinder internal pressure of the combustion cylinder b; Pcylubj is the cylinder internal pressure of the each unburnt cylinder j (j!=b).

$$Io \cdot \alpha_d = (Pcyl_b \cdot Sp + mp \cdot \alpha p_b) \cdot R_b + \sum_{j=1, j \neq b}^{L} \{(Pcylub_j \cdot Sp + mp \cdot \alpha p_j) \cdot R_j\} - Tex + \Delta Tt \quad (21)$$

An equation (22) is obtained by rearranging an equation (21) with regarding to "Pcylb×Sp×Rb" which is corresponding to the combustion gas pressure torque Tb generated in the crankshaft 2 by combustion.

$$Tb = Pcyl_b \cdot Sp \cdot R_b \quad (22)$$
$$= Io \cdot \alpha d - mp \cdot \alpha p_b \cdot R_b - \sum_{j=1, j \neq b}^{L} \{(Pcylub_j \cdot Sp + mp \cdot \alpha p_j) \cdot R_j\} + Tex - \Delta Tt$$

An equation (23) is obtained by rearranging the equation (22) about each term.

$$Tb = To - Tmb - Tmj - Tpj + Tex - \Delta Tt \quad (23)$$
$$To = Io \cdot \alpha d$$
$$Tmb = mp \cdot \alpha p_b \cdot R_b$$
$$Tmj = \sum_{j=1, j \neq b}^{L} (mp \cdot \alpha p_j \cdot R_j)$$
$$Tpj = \sum_{j=1, j \neq b}^{L} (Pcylub_j \cdot Sp \cdot R_j)$$

Here, To is the total inertia torque; Tmb is the piston inertia torque of the combustion cylinder; Tmj is the piston inertia torque of the unburnt cylinder; and Tpj is the cylinder internal pressure torque of the unburnt cylinder. Therefore, the combustion gas pressure torque Tb can be calculated by calculating each torque To, Tmb, Tmj, and Tpj on the right side of the first equation of the equation (23).

As shown in the second equation of the equation (23), the cylinder internal pressure estimation unit 53 calculates the total inertia torque To by multiplying the inertia moment Io of the rotation system to the crank angle acceleration αd. The cylinder internal pressure estimation unit 53 calculates the piston inertia torque Tmb of the combustion cylinder which was produced by the inertial force of the piston 5 of the combustion cylinder, based on the crank angle θd and the crank angle acceleration αd. Specifically, the cylinder internal pressure estimation unit 53 calculates an acceleration αpb of the piston 5 of the combustion cylinder b, based on the geometrical relation of the connecting rod 9 and the crank 32 which changes in accordance with the crank angle θdb of the combustion cylinder b, and the crank angle acceleration αd. The cylinder internal pressure estimation unit 53 calculates a conversion factor Rb of the combustion cylinder b, based on the crank angle θdb of the combustion cylinder b. As shown in the 3rd equation of the equation (23), the cylinder internal pressure estimation unit 53 calculates the piston inertia torque Tmb of the combustion cylinder by multiplying the acceleration αpb and the conversion factor Rb of the piston 5 of the combustion cylinder b to the mass mp of the piston 5.

The cylinder internal pressure estimation unit 53 calculates the piston inertia torque Tmj of the unburnt cylinder which was produced by the inertial force of the piston 5 of the unburnt cylinder, based on the crank angle θd and the crank angle acceleration αd. Specifically, the cylinder internal pressure estimation unit 53 calculates an acceleration αpj of the piston 5 of the unburnt cylinder j, based on the geometrical relation of the connecting rod 9 and the crank 32 which changes in accordance with the crank angle θdj of the unburnt cylinder j, and the crank angle acceleration αd. The cylinder internal pressure estimation unit 53 calculates a conversion factor Rj of the unburnt cylinder j, based on the crank angle θdj of the unburnt cylinder j. As shown in the 4th equation of the equation (23), the cylinder internal pressure estimation unit 53 calculates the piston inertia torque Tmj of the unburnt cylinder by multiplying the acceleration αpj and the conversion factor Rj of the piston 5 of the unburnt cylinder j to the mass mp of the piston 5.

The cylinder internal pressure estimation unit 53 calculates the cylinder internal pressure torque Tpj of the unburnt cylinder which was produced by the cylinder internal pressure Pcylubj of the unburnt cylinder j, based on the crank angle θd. The cylinder internal pressure Pcylj in the stroke other than the latter half of the compression stroke and the expansion stroke, in which combustion is performed, is a pressure according to the pressure in the intake manifold 12, the atmospheric pressure, and the crank angle θdj. The cylinder internal pressure estimation unit 53 estimates the cylinder internal pressure Pcylubj of the unburnt cylinder j, which is in the intake stroke, the compression stroke (except the latter half), or the exhaust stroke, based on the pressure in the intake manifold 12, the atmospheric pressure, and the crank angle θdj of the unburnt cylinder j. As shown in the 5th equation of the equation (23), the cylinder internal pressure estimation unit 53 calculates the cylinder internal pressure torque Tpj of the unburnt cylinder by multiplying the project area Sp of the piston 5 and the conversion factor Rj of the unburnt cylinder j to the cylinder internal pressure Pcylubj of the unburnt cylinder j.

Since the torsional vibration torque ΔTt becomes zero and the first term of the right side of the equation (21) becomes zero in the case where the piston 5 of the combustion cylinder b is located at the top dead center, by rearranging the equation (21) with regarding to the external load torque Tex, it becomes like an equation (24). It is assumed that the external load torque Tex becomes a constant value which is estimated at the top dead center, since the external load torque Tex does not change largely for 1 cycle.

$$Tex = \sum_{j=1, j \neq b}^{L} \{(Pcylub_j \cdot Sp + mp \cdot \alpha p_j) \cdot R_j\} - Io \cdot \alpha d \quad (24)$$

As shown in the equation (24), the cylinder internal pressure estimation unit 53 estimates the external load torque Tex by subtracting the total inertia torque Io×αd from a total value of the cylinder internal pressure torque Pcylubj×Sp×Rj of unburnt cylinder and the piston inertia torque mp×αpj×Rj of unburnt cylinder of the each unburnt cylinder j in the case where the crank angle is the top dead center of the combustion cylinder.

As shown in the equation (23), the cylinder internal pressure estimation unit 53 calculates, as the combustion gas pressure torque Tb, a value which subtracted the piston inertia torque Tmb of the combustion cylinder, the piston inertia torque Tmj of the unburnt cylinder, the cylinder internal pressure torque Tpj of the unburnt cylinder, and the torsional vibration torque ΔTt from the total inertia torque To and added the external load torque Tex to the total inertia torque To.

As shown in an equation (25), the cylinder internal pressure estimation unit 53 calculates the cylinder internal pressure Pcylb of the combustion cylinder by dividing the combustion gas pressure torque Tb by the project area Sp of the piston 5 and the conversion factor Rb of the combustion cylinder b.

$$Pcyl_b = \frac{Tb}{Sp \cdot Rb} \quad (25)$$

After end of the combustion period, based on information such as the crank angle acceleration αd and the torsional vibration torque ΔTt in the combustion period which are stored in the storage apparatus 91, the cylinder internal pressure estimation unit 53 calculates the cylinder internal pressure Pcylb of the combustion cylinder of the each crank angle θd, and stores them to the storage apparatus 91.

1-2-4. Combustion Parameter Calculation Unit 54

The combustion parameter calculation unit 54 calculates a combustion parameter of one or both of a heat release rate and mass combustion rate MFB based on the cylinder internal pressure Pcylb of the combustion cylinder.

In the present embodiment, the combustion parameter calculation unit 54 calculates the heat release rate dQ/dθ per unit crank angle using an equation (26). Here, κ is a ratio of specific heat; Vb is a cylinder volume of the combustion cylinder b. The combustion parameter calculation unit 54 calculates the cylinder volume Vb and the cylinder volume change rate dVb/dθ per unit crank angle, based on the geometrical relation of the crank angle θdb, the connecting rod 9, and the crank 32 of the combustion cylinder b.

$$\frac{dQ}{d\theta} = \frac{\kappa}{\kappa-1} \cdot Pcyl_b \cdot \frac{dV_b}{d\theta} + \frac{1}{\kappa-1} \cdot V_b \cdot \frac{dPcyl_b}{d\theta} \quad (26)$$

By use of an equation (27), the combustion parameter calculation unit 54 calculates the mass combustion rate MFB of the each crank angle θdb by dividing the momentary integral value, which integrated with the heat release rate dQ/dθ from a combustion start angle θ0 to the crank angle θdb, by a total integral value Q0, which integrated with the heat release rate dQ/dθ over a whole combustion angle section.

$$MFB(\theta d_b) = \frac{\int_{\theta_0}^{\theta d_b} \frac{dQ}{d\theta} d\theta}{Q_0} \quad (27)$$

After end of the combustion period, based on information such as the cylinder internal pressure Pcylb of the combustion cylinder in the combustion period stored in the storage apparatus 91, the combustion parameter calculation unit 54 calculates the combustion parameter, and stores it to the storage apparatus 91.

1-2-5. Combustion Control Unit 55

The combustion control unit 55 performs a combustion control which changes one or both of the ignition timing and the EGR amount, based on the combustion parameter. In the present embodiment, the combustion control unit 55 determines a crank angle θdb which the mass combustion rate MFB becomes 0.5 (50%) (referred to as a combustion gravity center), and changes the ignition timing so that the combustion gravity center approaches a preliminarily set target angle. For example, in the case where the combustion gravity center is on the retard angle side rather than the target angle, the combustion control unit 55 changes the ignition timing to the advance angle side. On the other hand, in the case where the combustion gravity center is on the advance angle side rather than the target angle, the combustion control unit 55 changes the ignition timing to the retard angle side. The combustion control unit 55 determines a crank angle period (referred to as a detected combustion period) when the mass combustion rate MFB becomes from 0.2 (20%) to 0.8 (80%), and changes the opening degree of the EGR valve 22 so that the detected combustion period approaches a preliminarily set target combustion period. For example, in the case where the detected combustion period is shorter than the target combustion period, the combustion control unit 55 increases the opening degree of the EGR valve 22 so as to increase the EGR amount. When the EGR amount increases, a combustion speed becomes slow and the detected combustion period becomes long. On the other hand, in the case where the detected combustion period is longer than the target combustion period, the combustion control unit 55 decreases the opening degree of the EGR valve 22 so as to decrease the EGR amount.

Alternatively, the combustion control unit 55 may be configured to determine the crank angle θdb at which the heat release rate dQ/dθ becomes a maximum value, and change one or both of the ignition timing and the EGR amount so that the crank angle θdb approaches a preliminarily set target angle.

1-2-6. Control Behavior

Figure 10:
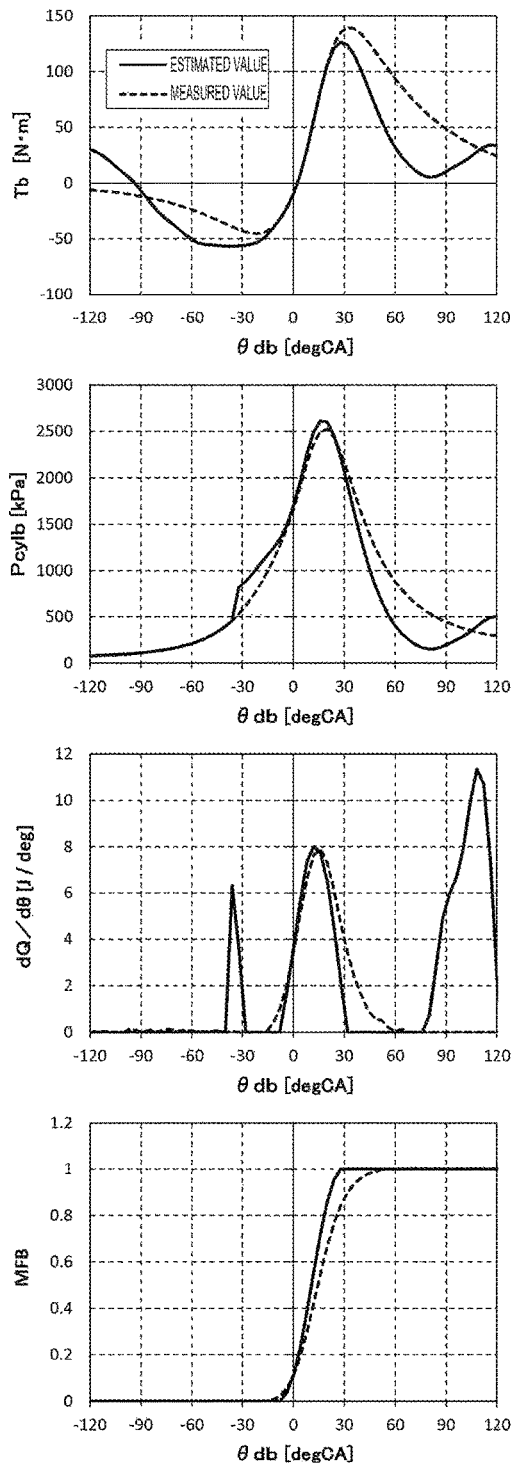
FIG. 10 is a graph for explaining difference of with and without consideration of torsional torque according to Embodiment 1 of the present invention.
Figure 10:
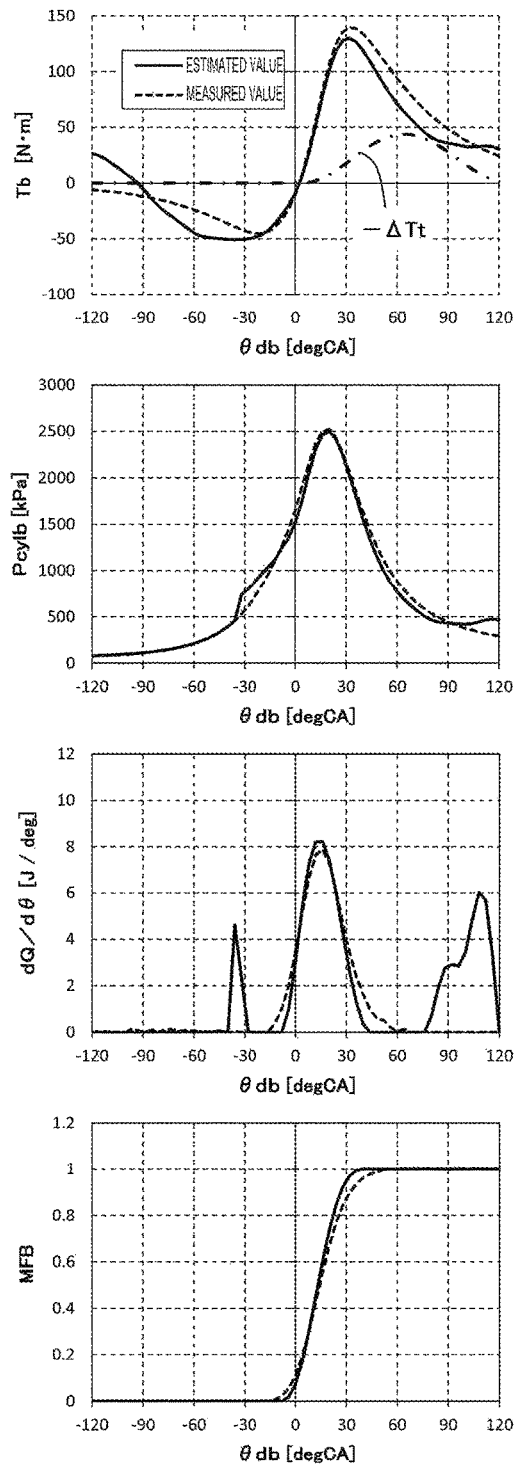

Using FIG. 10, in the case where the present embodiment which calculates the combustion gas pressure torque Tb with consideration of the torsional vibration torque ΔTt, and in the case where the comparative example which calculates the combustion gas pressure torque Tb without consideration of the torsional vibration torque ΔTt, the calculation accuracy of the cylinder internal pressure, the heat release rate, and the mass combustion rate is explained. The column on the left side of FIG. 10 shows behavior of each calculated value in the case where the comparative example which is not taking the torsional vibration torque ΔTt into consideration. The column on the right side of FIG. 10 shows behavior of each calculated value in the case where the present embodiment which is taking the torsional vibration torque ΔTt into consideration. The measured value in the figure means a value calculated from cylinder internal pressure measured by a cylinder internal pressure sensor.

In the case of the comparative example on the left side of FIG. 10, it is seen that after the combustion gas pressure torque Tb and the cylinder internal pressure Pcylb of the combustion cylinder become the maximum, they drop largely as compared with the measured value. It is considered that this drop is caused by twist return after the crankshaft is twisted to the maximum. In the case of the present embodiment on the right side of FIG. 10, as shown in the equation (23), the combustion gas pressure torque Tb increases by a torque which multiplied −1 to the torsional vibration torque ΔTt as compared with the case of the comparative example, and the drop of the combustion gas pressure torque Tb and the cylinder internal pressure Pcylb of the combustion cylinder is improved.

Also about the heat release rate dQ/dθ and the mass combustion rate MFB, in the case of the comparative example on the left side, by the drop of the cylinder internal pressure Pcylb of the combustion cylinder, it is calculated as combustion is finished at an early stage rather than the measured value, but it is improved in the present embodiment on the right side. In the graph of the heat release rate dQ/dθ, since a component near −30 degree and near 90 degree of the crank angle θdb is a noise component, it was eliminated at the time of MFB calculation. Therefore, in the present embodiment, the control accuracy of the combustion control which used the combustion parameter of the heat release rate dQ/dθ and the mass combustion rate MFB can be improved.

1-2-7. Flowchart

The procedure (the control method of internal combustion engine 1) of schematic processing of the controller 50 concerning the present embodiment is explained based on the flow chart shown in FIG. 11. The processing represented in the flowchart in FIG. 11 is recurrently implemented, for example, every predetermined operation cycle while the computing processing unit 90 implements software (a program) stored in the storage apparatus 91.

In the step S51, the angle information calculation unit 51 implements an angle information detection processing (an angle information detection step) for, as mentioned above, detecting the crank angle θd based on the output signal of the specific crank angle sensor 6, and calculating the crank angle speed ωd which is the time change rate of the crank angle θd, and the crank angle acceleration αd which is the time change rate of the crank angle speed ωd.

In the present embodiment, the angle information calculation unit 51 is provided with the angle information detection unit 60, the angle information correction unit 61, and the after-correction angle information calculation unit 62, and implements an error correction processing for correcting the error of the angle information.

In the step S52, the torsional torque calculation unit 52 implements a torsional torque calculation processing (a torsional torque calculation step) for, as mentioned above, calculating the maximum value ΔTtmax of torsional vibration torque based on the crank angle acceleration αd in the combustion period, and calculating, as the torsional vibration torque ΔTt in the combustion period, the value which has the amplitude of the maximum value ΔTtmax of torsional vibration torque and vibrates with the preliminarily set natural angular frequency ωn.

In the step S53, the cylinder internal pressure estimation unit 53 implements a cylinder internal pressure estimation processing (a cylinder internal pressure estimation step) for, as mentioned above, calculating the combustion gas pressure torque Tb, by use of the equation of motion of the rotation system of the crankshaft 2, based on the crank angle θd, the crank angle acceleration αd, and the torsional vibration torque ΔTt, and estimating the cylinder internal pressure Pcylb of the combustion cylinder, based on the combustion gas pressure torque Tb and the crank angle θd.

In the step S54, the combustion parameter calculation unit 54 implements a combustion parameter calculation processing (a combustion parameter calculation step) for, as mentioned above, calculating the combustion parameter of one or both of the heat release rate and mass combustion rate MFB, based on the cylinder internal pressure Pcylb of the combustion cylinder.

In the step S55, the combustion control unit 55 implements a combustion control processing (a combustion control step) for, as mentioned above, performing the combustion control which changes one or both of the ignition timing and the EGR amount, based on the combustion parameter.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the second crank angle sensor 6 corresponds to "the specific crank angle sensor" in the present invention, the flywheel 27 corresponds to "the rotation member" in the present invention, the tooth of ring gear 25 provided in flywheel 27 corresponds to the "the detected unit" in this present invention. However, embodiments of the present invention are not limited to the foregoing case. That is to say, the first crank angle sensor 11 may correspond to "the specific crank angle sensor" in the present invention, the signal plate 10 may correspond to "the rotation member" in the present invention, a plurality of teeth provided in the signal plate 10 may correspond to the "the detected unit" in the present invention.

(2) In the above-mentioned Embodiment 1, there has been explained the case where the internal combustion engine 1 is a gasoline engine. However, embodiments of the present invention are not limited to the foregoing case. That is to say, the internal combustion engine 1 may be various kinds of internal combustion engines, such as a diesel engine and an engine which performs HCCI combustion (Homogeneous-Charge Compression Ignition Combustion).

(3) In the above-mentioned Embodiment 1, there has been explained the case where the torsional torque calculation unit 52 calculates the torsional vibration torque ΔTt using the equation (18). However, embodiments of the present invention are not limited to the foregoing case. That is to say, the torsional torque calculation unit 52 may use any vibration waveforms other than the equation of the trigonometric function of the equation (18) as the vibration waveform which vibrates with the natural angular frequency ωn. For example, by use of a data table in which the relationship between time t and the value of vibration waveform is preliminarily set, the torsional torque calculation unit 52 may be configured to read the value of the vibration waveform corresponding to time t after the vibration start crank angle.

(4) In the above-mentioned Embodiment 1, there has been explained the case where the torsional torque calculation unit 52 calculates, as the torsional vibration torque ΔTt, a component of the torsional torque which decreases by decreasing the torsional angle of the crankshaft 2 by twist return from the state where the crankshaft 2 was twisted to the maximum by the maximum torque in combustion. However, embodiments of the present invention are not limited to the foregoing case. That is to say, the torsional torque calculation unit 52 should just calculate the torsional vibration torque in the combustion period; for example, in addition to the component of the torsional torque by twist return, the torsional torque calculation unit 52 may be configured to calculate, as the torsional vibration torque ΔTt, a component of the torsional torque which increases by increasing the torsional angle of the crankshaft 2 by combustion torque.

(5) In the above-mentioned Embodiment 1, there has been explained the case where the controller 50 calculates the heat release rate and the mass combustion rate, and performs the combustion control, based on the cylinder internal pressure Pcylb of the combustion cylinder. However, embodiments of the present invention are not limited to the foregoing case. That is to say, the controller 50 may be configured to perform other control, such as misfire detecting of combustion of the each cylinder 7, based on the cylinder internal pressure Pcylb of the combustion cylinder and the heat release rate which are calculated.

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine that is provided with a plurality of detected units provided in a rotation member, which rotates integrally with a crankshaft, at a plurality of preliminarily set crank angles, and a specific crank angle sensor which is fixed to a nonrotation member and detects the plurality of detected units, the controller for an internal combustion engine comprising:

at least one processor configured to implement:
    an angle information calculator that detects a crank angle based on an output signal of the specific crank angle sensor, and calculates a crank angle speed which is a time change rate of the crank angle, and a crank angle acceleration which is a time change rate of the crank angle speed;
    a torsional torque calculator that calculates a maximum value of a torsional vibration torque which is a vibration component of a torsional torque produced by torsion of the crankshaft, based on the crank angle acceleration in a combustion period, by multiplying a preliminarily set conversion constant with a maximum value of the crank angle acceleration in the combustion period, and calculates a waveform which has an amplitude of the maximum value of the torsional vibration torque and vibrates with a preliminarily set natural angular frequency of the torsional vibration, as the torsional vibration torque in the combustion period;

a cylinder internal pressure estimator that calculates a combustion gas pressure torque produced by combustion, by use of an equation of motion of a rotation system of the crankshaft containing piston, connecting rod, and crank of the internal combustion engine, based on the crank angle, the crank angle acceleration, and the torsional vibration torque, and estimates a cylinder internal pressure of a combustion cylinder, based on the combustion gas pressure torque and the crank angle;

a combustion parameter calculator that calculates a combustion parameter of one or both of a heat release rate and a mass combustion rate based on the cylinder internal pressure of the combustion cylinder; and a combustion control unit that changes one or both of an ignition timing and an EGR amount based on the combustion parameter.

2. The controller for the internal combustion engine according to claim 1, wherein the torsional torque calculator calculates a basic vibration waveform which starts vibration from a vibration start crank angle which is set in the combustion period, using a preliminarily set vibration waveform which vibrates with the natural angular frequency, and calculates a waveform which has an amplitude of the maximum value of the torsional vibration torque and vibrates with the basic vibration waveform, as the torsional vibration torque in the combustion period.

3. The controller for the internal combustion engine according to claim 1, wherein the torsional torque calculator sets the torsional vibration torque to $\Delta Tt$, sets the maximum value of the torsional vibration torque to $\Delta Ttmax$, sets the natural angular frequency to $\omega n$, and sets time after a vibration start crank angle which is set in the combustion period to t;

calculates the torsional vibration torque by an equation of $$\Delta Tt = \Delta Ttmax \times \{\cos(\omega n \times t) - 1\};$$

and sets the torsional vibration torque before the vibration start crank angle to 0.

4. The controller for the internal combustion engine according to claim 1, wherein the torsional torque calculator calculates the torsional vibration torque which starts vibration from a vibration start crank angle which is set at a crank angle between a top dead center of the combustion cylinder and a crank angle at which the torsional vibration torque becomes the maximum value.

5. The controller for the internal combustion engine according to claim 1, wherein the torsional torque calculator calculates, as the torsional vibration torque, a component of the torsional torque which decreases by decreasing the torsional angle of the crankshaft by twist return from the state where the crankshaft was twisted to the maximum by the maximum torque in combustion.

6. The controller for the internal combustion engine according to claim 1, wherein the cylinder internal pressure estimator calculates a total inertia torque by multiplying an inertia moment of the rotation system to the crank angle acceleration;

calculates a piston inertia torque of the combustion cylinder which was produced by an inertial force of a piston of the combustion cylinder, and a piston inertia torque of an unburnt cylinder which was produced by an inertial force of a piston of the unburnt cylinder, based on the crank angle and the crank angle acceleration;

calculates a cylinder internal pressure torque of the unburnt cylinder which was produced by a cylinder internal pressure of the unburnt cylinder based on the crank angle;

calculates an external load torque by subtracting the total inertia torque from a total value of the cylinder internal pressure torque of the unburnt cylinder and the piston inertia torque of the unburnt cylinder in the case where the crank angle is the top dead center of the combustion cylinder, and calculates, as the combustion gas pressure torque, a value which subtracted the piston inertia torque of the combustion cylinder, the piston inertia torque of the unburnt cylinder, the cylinder internal pressure torque of the unburnt cylinder, and the torsional vibration torque from the total inertia torque, and added the external load torque to the total inertia torque.

7. A control method for an internal combustion engine that is provided with a plurality of detected units provided in a rotation member, which rotates integrally with a crankshaft, at a plurality of preliminarily set crank angles, and a specific crank angle sensor which is fixed to a nonrotation member and detects the plurality of detected units, the control method for an internal combustion engine comprising:

an angle information calculating that detects a crank angle based on an output signal of the specific crank angle sensor, and calculates a crank angle speed which is a time change rate of the crank angle, and a crank angle acceleration which is a time change rate of the crank angle speed;

a torsional torque calculating that calculates a maximum value of a torsional vibration torque which is a vibration component of a torsional torque produced by torsion of the crankshaft, based on the crank angle acceleration in a combustion period, by multiplying a preliminarily set conversion constant with a maximum value of the crank angle acceleration in the combustion period, and calculates a waveform which has an amplitude of the maximum value of the torsional vibration torque and vibrates with a preliminarily set natural angular frequency of the torsional vibration, as the torsional vibration torque in the combustion period;

a cylinder internal pressure estimating that calculates a combustion gas pressure torque produced by combustion, by use of an equation of motion of a rotation system of the crankshaft containing piston, connecting rod, and crank of the internal combustion engine, based on the crank angle, the crank angle acceleration, and the torsional vibration torque, and estimates a cylinder internal pressure of a combustion cylinder, based on the combustion gas pressure torque and the crank angle;

a combustion parameter calculating that calculates a combustion parameter of one or both of a heat release rate and a mass combustion rate based on the cylinder internal pressure of the combustion cylinder; and a combustion controlling that changes one or both of an ignition timing and an EGR amount based on the combustion parameter.

* * * * *